(12) United States Patent
Brewer et al.

(10) Patent No.: US 12,437,010 B2
(45) Date of Patent: Oct. 7, 2025

(54) AUTOMATIC TECHNIQUES FOR CONSTRUCTING AN EVOLVING INTEREST TAXONOMY FROM USER-GENERATED CONTENT

(71) Applicant: Snap Inc., Santa Monica, CA (US)

(72) Inventors: Jason Brewer, Mountain View, CA (US); Shuo Han, Milpitas, CA (US); Chang Kuang Huang, Cupertino, CA (US); James Li, Mountain View, CA (US); Yiwei Ma, Santa Monica, CA (US); Manish Malik, Cupertino, CA (US); Yinan Na, Mountain View, CA (US); Dan Xie, Mountain View, CA (US); Jinchao Ye, New York, NY (US); Lili Zhang, Redwood City, CA (US); Mingtao Zhang, Los Angeles, CA (US); Yining Zhang, Seattle, WA (US); Hangqi Zhao, Bothell, WA (US); Ding Zhou, Los Altos Hills, CA (US); Yang Zhou, San Francisco, CA (US)

(73) Assignee: Snap Inc., Santa Monica, CA (US)

( * ) Notice: Subject to any disclaimer, the term of this patent is extended or adjusted under 35 U.S.C. 154(b) by 0 days.

(21) Appl. No.: 18/436,945

(22) Filed: Feb. 8, 2024

(65) Prior Publication Data

US 2025/0258878 A1   Aug. 14, 2025

(51) Int. Cl.
G06F 16/953 (2019.01)
G06F 16/9532 (2019.01)
G06F 16/9535 (2019.01)

(52) U.S. Cl.
CPC ...... *G06F 16/9532* (2019.01); *G06F 16/9535* (2019.01)

(58) Field of Classification Search
None
See application file for complete search history.

(56) References Cited

U.S. PATENT DOCUMENTS

| | | | |
|---|---|---|---|
| 2007/0143278 A1* | 6/2007 | Srivastava | G06F 16/33 707/999.005 |
| 2011/0153423 A1* | 6/2011 | Elvekrog | G06F 16/953 |
| 2016/0140454 A1* | 5/2016 | Gupta | G06F 16/95 |

(Continued)

*Primary Examiner* — Son T Hoang
(74) *Attorney, Agent, or Firm* — Schwegman Lundberg & Woessner, P.A.

(57) ABSTRACT

Techniques for creating an interest graph include obtaining content items from multiple content sources and applying tailored (e.g., source-specific) preprocessing to the content items based on their respective content source. Text is extracted and salient keywords and key phrases are identified using unsupervised machine learning models. The keywords and key phrases become nodes in an interest graph, each node comprising an embedding of a keyword or key phrase in a common embedding space, with edges representing semantic similarity based on embeddings or co-engagement patterns. The graph provides an expansive, granular, and dynamic taxonomy easily adaptable to emerging interests. The interest graph overcomes limitations of conventional taxonomies that lack depth, fail to capture niche interests, and cannot adapt to reflect evolving user preferences. The described techniques construct a rich interest graph from diverse content for improved content understanding.

18 Claims, 8 Drawing Sheets

(56) References Cited

U.S. PATENT DOCUMENTS

| | | | |
|---|---|---|---|
| 2018/0089311 A1* | 3/2018 | Soni | G06F 16/9535 |
| 2021/0304253 A1* | 9/2021 | Kumbi | G06F 16/90 |
| 2022/0188661 A1* | 6/2022 | Tappin | G06F 16/248 |
| 2023/0033211 A1* | 2/2023 | Ferreira Lima | G06F 16/3344 |
| 2023/0055769 A1* | 2/2023 | Fusco | G06F 16/93 |
| 2023/0154159 A1* | 5/2023 | Kim | G06F 16/245 |
| 2024/0087547 A1* | 3/2024 | Ivers | G06F 16/686 |
| 2024/0121125 A1* | 4/2024 | Blair | G06F 16/345 |
| 2024/0354317 A1* | 10/2024 | Fayyaz | G06F 16/3347 |
| 2024/0394592 A1* | 11/2024 | Srinivasa | G06F 16/93 |

* cited by examiner

AUTOMATIC TECHNIQUES FOR CONSTRUCTING AN EVOLVING INTEREST TAXONOMY FROM USER-GENERATED CONTENT

TECHNICAL FIELD

The present application relates generally to the fields of content understanding and content curation for online platforms and services, and more specifically to the technology involved in extracting content understanding signals from content items provided to an online platform or service, and matching content items to the interests of users of the online platform or service.

BACKGROUND

The rise of mobile computing devices, such as smartphones and tablets, along with advances in imaging technology, have made it easier than ever for people to generate visual content, such as photos and videos. Smartphones now come equipped with high-resolution cameras having powerful image sensors that allow people to capture professional-looking photos and videos on the go. The mobility of these devices means people can capture photos and videos at any time, from any location. This has led to an explosion of user-generated visual content. At the same time, the mobile app ecosystem has given rise to numerous social media platforms and services with sophisticated tools for editing and enhancing photos and videos. Apps like Instagram®, Snapchat®, and TikTok®, to name only a few, provide users with filters, effects, and editing capabilities right on their mobile devices. This makes it simple for anyone to stylize and polish their visual content before sharing the visual content with others. The social component of these online platforms and services also adds a level of motivation, as users try to get more likes and comments.

Together, the advances in mobile imaging technology and photo/video editing apps have put content creation into the hands of the masses. Where high-quality visual media was once confined to professionals, now anyone with a smartphone can produce eye-catching photos and videos. This democratization of content creation has multiplied the amount of user-generated visual content online exponentially. Understanding and effectively utilizing this massive amount of user-generated content presents an opportunity as well as a technological challenge. For example, while this visual content may be rich and diverse, it can be overwhelming for users to navigate and find content that aligns with their interests. Therefore, there is a need for effective content understanding and content curation that can "understand", select, and present content that matches the interests of individual users. Content understanding and content curation involve the process of gathering, analyzing, organizing, and presenting content in a meaningful and organized way. In the context of user-generated content, this process becomes more complex due to the sheer volume and diversity of the content. Therefore, technology plays a crucial role in automating and enhancing the process.

BRIEF DESCRIPTION OF THE DRAWINGS

In the drawings, which are not necessarily drawn to scale, like numerals may describe similar components in different views. To easily identify the discussion of any particular element or operation, the most significant digit or digits in a reference number refer to the figure number in which that element is first introduced. Some non-limiting examples are illustrated in the figures of the accompanying drawings in which.

DETAILED DESCRIPTION

Figure 1:
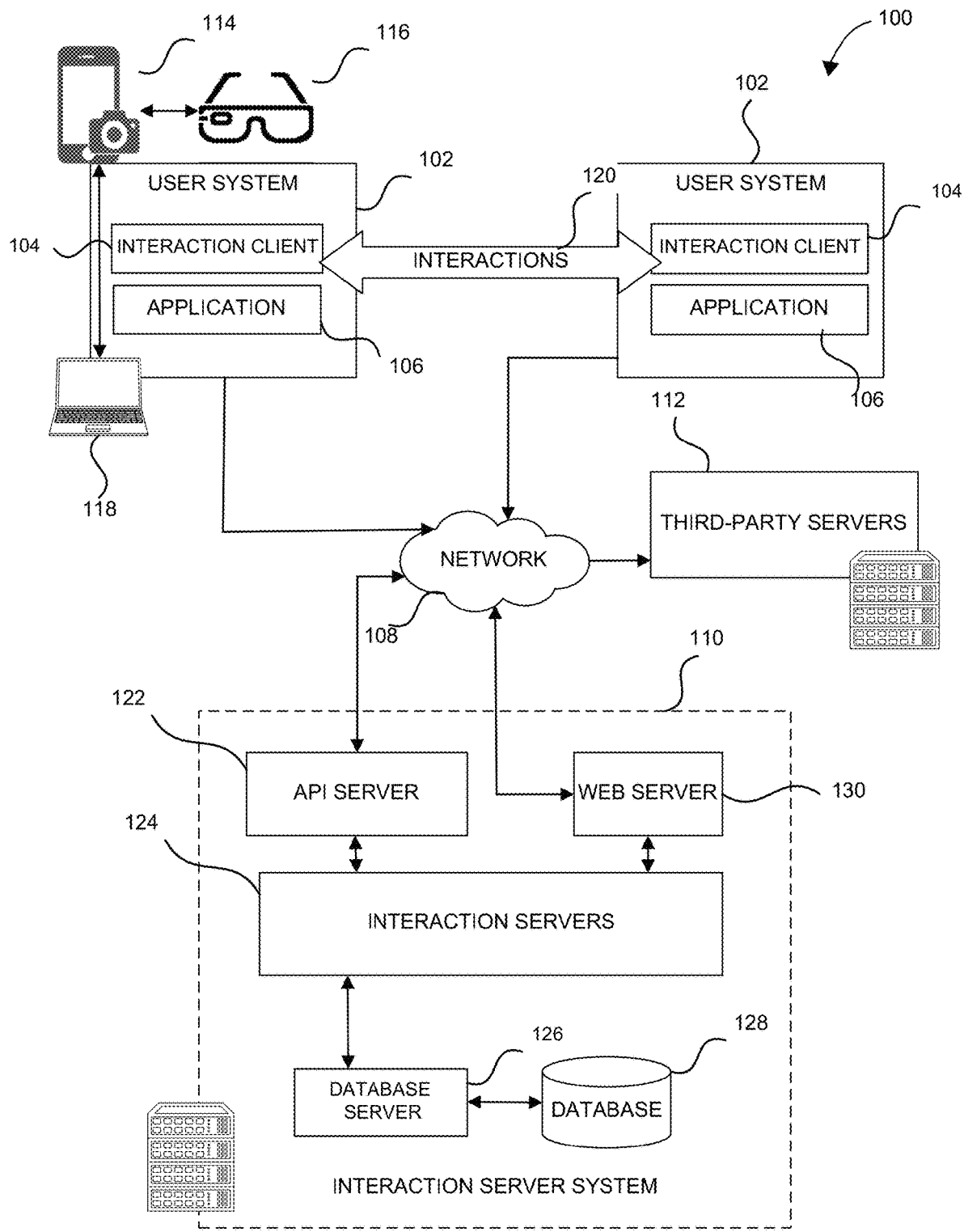
FIG. 1 is a diagrammatic representation of a computer networking environment including an interaction system with which content understanding and content curation systems may be deployed, according to some examples.

Described herein are methods and systems which leverage various machine learning techniques to extract meaningful content understanding signals from user-generated content, curate the user-generated content, and match the curated content with user interests. In the following description, for purposes of explanation, numerous specific details are set forth to provide a thorough understanding of the various aspects of different embodiments of the present invention. It will be evident, however, to one skilled in the art, that the present invention may be practiced without all of these specific details.

In the context of an online platform or service, content understanding and content curation are processes for understanding, gathering, organizing, and presenting content in a meaningful and relevant way. Content understanding refers to the automated analysis of user-generated content, such as photos, videos, text, and other content submitted to an online platform or service. Generally, the goal of a content learning algorithm and system is to algorithmically understand the subject matter, topics, and intent represented in an individual content item. Here, the term "content item" is intended to include all of the various content that is part of a single content posting. For example, when a user submits a content item, the content item may comprise a variety of individual content elements, such as: a photo, a video, a caption, a title, a comment from the content poster or another user, one or more overlays, such as text, stickers, emoji, an augmented reality effect, and so forth.

Content curation is the process of identifying, selecting, and organizing the most relevant and high-quality user-generated content items. Content curation relies heavily on effective content understanding techniques. By analyzing user-generated content to discern a content item's meaning, intent, and quality, online platforms and services can curate the best content to highlight, and to recommend to individual users. Furthermore, effective content curation requires the ability to understand a user's implicit intent and preferences when interacting with content, even without the user expressly stating their interests. By extracting signals from how users engage with content, platforms can better understand what types of content align with each user's interest or tastes. This enables more accurate curation tailored to unstated user preferences. By thoroughly understanding both the content and the user, the online platform or service is able to provide its users with personalized experiences optimized to their interests and preferences.

Content understanding and content curation are critical components of online platforms centered around user-generated content, as they enable personalized experiences that boost engagement and loyalty. Effective content curation allows online platforms and services to tailor content to each user based on their unique interests and preferences. This provides a personalized touch and assists users in discovering new yet relevant content. When presented with well-curated content that aligns with their tastes, users spend more time on the platform or service and develop a sense of loyalty to a brand. In essence, accurate content understanding powers meaningful curation, which in turn delivers personalized experiences that keep users engaged and loyal to the online platform or service.

However, many existing content understanding and content curation techniques used today have inherent limitations that restrict their capabilities. Conventional content understanding techniques often utilize taxonomies that lack sufficient depth and granularity. Many techniques depend on predefined taxonomies with a relatively small number of high-level, generic categories. For instance, a taxonomy may contain broad categories like "sports", "music", or "animals" without any nuance or specificity within those groups. As a result, the taxonomy lacks the precision required to accurately match users with more niche, specialized interests within those macro categories. A sports fan interested in basketball would be poorly served by a taxonomy that cannot distinguish basketball from football or hockey. In short, many conventional techniques perform poorly due to taxonomies that lack depth and thus fail to capture the diversity and specificity of real-world user interests.

Another limitation of conventional content understanding techniques is their static, unchanging nature over time. Many conventional techniques rely on predefined taxonomies and models that, once deployed, remain largely fixed. As a result, these techniques fail to adapt as interests evolve and new trends emerge. For instance, interest in a newly released movie or video game will not be captured if the underlying taxonomy or model does not actively account for these new topics. Without continuous updates, conventional systems grow stale as novel content categories gain traction among users. This inability to dynamically adapt leads to a gradual degradation in performance. Conventional techniques may perform well immediately after deployment, but will become increasingly ineffective as interests shift unless the system can automatically detect and incorporate emerging content categories. Accordingly, the static nature of conventional techniques renders them unable to keep pace with the ever-changing landscape of user interests.

Another shortcoming of conventional content understanding techniques is their frequently incomplete coverage of overall content. Many techniques depend on predefined taxonomies that only cover a subset of the vast range of topics or subject matter submitted by users. For example, a taxonomy may have categories for common interests like sports, pets, and food, but lack niche categories related to anime, birdwatching, or abstract art. With large volumes of user-generated content spanning countless topics, conventional taxonomies are unable to adequately categorize all content. Even if a taxonomy has hundreds of categories, there will inevitably be gaps that lead certain content to be completely overlooked or uncategorized. Furthermore, techniques that rely solely on manual taxonomy curation cannot scale to keep pace with the explosive growth of user-generated content. With fundamental gaps in their taxonomies, conventional systems deliver incomplete and fragmented understandings of the full spectrum of user interests and content. Their coverage remains limited despite continual content expansion.

A fourth limitation of conventional content understanding techniques is fragmentation across different products and content types. Many systems are designed for a specific product offering, content delivery service, or content format, leading to disjointed taxonomies and models. For instance, an online platform or service may use one taxonomy for short-form video understanding, and a completely separate taxonomy for long-form text content, and yet another taxonomy for advertising. Or a social media company may have distinct content classification models for their main application versus their messaging application. This fragmentation introduces redundancies and inefficiencies, as entirely separate content understanding pipelines must be built and maintained. Valuable learnings from one product's or service's taxonomy do not transfer or generalize to other products or services. And with disjointed systems, generating a unified understanding of interests across a user's cross-product activity becomes extremely difficult. Maintaining fragmented, product-specific content understanding techniques imposes unnecessary overhead. It also restricts the platform's ability to holistically understand users and content across surface-level product boundaries. Ultimately, fragmentation leads to wasted resources, knowledge silos, and an incomplete perspective.

Embodiments of the present invention aim to address the aforementioned technical problems by providing improved techniques for the automated tasks related to and involved in content understanding and content creation. Consistent with some embodiments, an interest graph is first derived by performing a variety of data pre-processing and machine learning tasks, using as input a large corpus of content items from each of several different product offerings or content distribution services associated with the online platform or service. Here, a product offering or content distribution service is a specific feature or function of the online service, where the content items associated with each offering (e.g., a content source) may differ in one or more ways. Because the content items associated with each product offering may have distinct characteristics or format, distinct or tailored text pre-processing steps can be applied to content items from each content source. By way of example, a first product offering may provide content items in a news feed, where the content items are posted or published by news publishers who are dedicated publishing partners of the online platform or service. These publishing partners may be well known influencers or brands. For content items from this first product offering, which may contain news and stories with text-based headlines from professional publishers, clean text extraction may be easily performed to identify keywords and key phrases from headlines.

A second product offering or content distribution service may be a news feed presenting user-generated content from a wide variety of sources, including regular members of the online platform or service. User-generated content from a product offering like a news feed of popular user submissions may have less reliable textual components compared to professionally produced content. These user content posts often contain informal captions and text overlays where optical character recognition may be less reliable. However, this content frequently includes user-submitted hashtags, which can be split into component words through preprocessing. For example, the hashtag "#foodielife" could be divided into the words "foodie" and "life." Additionally, any captions, text overlays, and user comments accompanying the content posts can be extracted and parsed into words and sentences through natural language processing techniques. While not as robust as text from formal publications, useful textual signals can still be extracted from user-generated content by leveraging hashtags and supplementing with other available text. The hashtags, in particular, provide a rich source of topical information that can be unlocked through basic preprocessing.

In addition to the tailored preprocessing applied to content items from specific sources, some common preprocessing steps may be applied to content items across all sources. This may occur before, or after, the source-specific preprocessing steps. For example, videos from any source may be analyzed using speech-to-text translation techniques to extract text transcripts. Similarly, optical character recognition (OCR) techniques can be applied to photos, graphics, and videos from any source to extract text visible in the visual content. Other common preprocessing may include parsing extracted text into words and sentences, normalizing words to common spelling variations, deduplication, and removing stop words. Applying these universal preprocessing steps in addition to the tailored steps provides the maximum amount of high-quality text to feed into the downstream data processing steps, including machine learning algorithms.

After performing the preprocessing on the content items from the different content sources, the extracted and preprocessed text provides a rich corpus that can be leveraged to identify salient keywords and key phrases, using text-based mining and machine learning techniques. For example, keyword extraction algorithms such as TF-IDF (Term Frequency-Inverse Document Frequency), RAKE (Rapid Automatic Keyword Extraction), or TextRank can be applied to identify words that are unusually frequent in a given document (e.g., a content item) but not common across the entire corpus. This allows niche interests and trending topics to be surfaced as keywords. Additionally, topic modeling algorithms such as Latent Dirichlet Allocation (LDA) or Non-negative Matrix Factorization (NMF) can be applied to the corpus, or to specific content items, to discover latent topics and identify words most relevant to each topic. By applying these text-based machine learning techniques, the most prominent keywords and key phrases within the content corpus can be determined. These salient text elements provide the foundation for generating the interest graph.

With some embodiments, the machine learning models used to identify salient keywords and key phrases are primarily unsupervised models. The benefit of unsupervised models is that they can accommodate new topics and interests that emerge over time, even if those topics are not already prevalent in historical data. For example, an unsupervised keyword extraction model can identify a newly trending keyword related to a recent event or pop culture phenomenon, even if that keyword was rarely used in the past. This allows the interest graph to dynamically evolve as interests change, rather than being limited to topics that were historically popular. Similarly, unsupervised topic models can discover new latent topics within recent content, detecting novel interests as they gain traction. By leveraging unsupervised techniques, the interest graph can continuously adapt to capture emerging trends and interests reflected in the most recent user-generated content.

With the keywords and key phrases identified, an interest graph is constructed. With some embodiments, the interest graph is constructed by first generating vector representations of the extracted keywords and key phrases. This may be done using one or more word embedding models. Word embedding models are a type of machine learning model that encodes words and phrases into dense vector representations in a common embedding space. The relative positioning of the vectors in this space encodes semantic similarities between the meanings of the words and phrases. Popular word embedding models that can be leveraged include Word2Vec, GloVe, FastText, ELMo, and BERT. These models are trained on large text corpora to develop embedding spaces that capture nuanced syntactic and semantic relationships between textual elements. The keyword and key phrase embeddings generated by these models provide vector representations that capture degrees of similarity in meaning.

In addition or as an alternative to leveraging pre-trained word embedding models, custom models can be developed to generate embeddings tailored to the specific vocabulary of keywords and key phrases extracted from the platform's content corpus. Beyond semantic similarity derived from embeddings, the interest graph edges can also encode co-engagement relationships between keywords and key phrases. Specifically, the frequency with which users engage with content items tagged with particular keywords can reveal useful co-occurrence and relatedness patterns. For example, if users frequently engage with content tagged with both "dogs" and "puppies", this implies a strong co-engagement relationship despite limited semantic overlap. Both semantic similarity based on embeddings and behavioral co-engagement metrics can be used to connect related keyword and key phrase nodes in the interest graph.

The interest graph formed in part through unsupervised learning provides a rich taxonomy that overcomes limitations of conventional taxonomies. Rather than relying on a human-curated taxonomy with a few hundred predefined categories, the interest graph contains thousands of nodes capturing granular interests. The graph can adapt dynamically rather than remaining static, by continuously ingesting new textual data to identify emerging interests. For example, the ingesting of new data may occur on a regular, periodic basis-such as every few days, weeks, months, quarters, and so forth. And the graph provides comprehensive coverage of niche interests that would be overlooked by limited manual taxonomies. By leveraging unsupervised learning on diverse textual data, the interest graph serves as an evolving taxonomy with greater depth, dynamism, and coverage compared to conventional taxonomies.

Given the extremely large number of nodes in the interest graph, capturing granular interest categories, training a traditional multi-class classifier to tag new visual content is extremely difficult. A multi-class classifier requires sufficient (human) labeled training data containing positive examples for each class in order to accurately classify new data points. But for a taxonomy with thousands of niche interest categories, collecting adequate positive training examples for every single class is infeasible, as the amount of human-labeled data required is impractical at this scale. The breadth and specificity of the interest graph makes training data collection for a multi-class classifier intractable.

To overcome the limitations and difficulties of multi-class classification, a pairwise classification model is utilized instead. Rather than framing the problem as classifying a content item into one of thousands of predefined classes, the pairwise model determines the similarity between a visual content item (e.g., an image or video) and each individual interest category—for example, each node in the interest graph representing a keyword or key phrase.

Specifically, consistent with some examples, the model is trained on pairs of input data, with each training example in the training dataset consisting of a visual content (e.g., an image or video) paired with text from an interest category from the interest graph. The model learns to predict if the content-text pair exhibits a semantic match, without needing to assign the content to a single class. Once trained, the pairwise model can rapidly score new visual content against all interest categories by passing each (content, category) pair through the model to obtain similarity scores. In some examples, the tagging of visual content is achieved by assigning to a visual content item some predetermined number of tags, associated with nodes in the interest graph and representing keywords and key phrases, that have the highest similarities scores exceeding some threshold.

Compared to multi-class classification, the pairwise approach drastically reduces the amount of training data required, since positive examples are only needed for a subset of (content, category) pairs. The model can generalize to unseen categories based on their semantic text embeddings. This allows coverage of the extensive interest graph within a feasible training data budget. The pairwise architecture circumvents the scaling challenges of multi-class classification for large taxonomies.

The techniques described herein for interest discovery, interest graph creation, and content tagging using pairwise machine learning models provide an improved solution for content understanding compared to conventional systems. Specifically, the interest graph taxonomy is more expansive and granular than predefined taxonomies, covering a broader range of niche topics. The graph can adapt dynamically as new interests emerge, overcoming the static nature of conventional taxonomies. Finally, the pairwise machine learning approach for content tagging is highly data-efficient, enabling broader coverage of diverse content with limited training data. Together, these advantages deliver deeper, more adaptable, and more complete content understanding compared to previous techniques. This enables personalized content curation at scale across an online platform's or service's diverse array of user-generated content. The combination of an expansive and agile interest graph taxonomy with a flexible pairwise machine learning model for content tagging provides a robust solution for understanding user-generated content in context of evolving user interests.

Other aspects and advantages of the various embodiments are described in connection with the description of the several figures that follow, FIG. 1 is a block diagram showing an example interaction system 100 for facilitating interactions (e.g., exchanging text messages, conducting text audio and video calls, or playing games) over a network 108. These interactions, in many instances, involve the sharing of user-generated content items. The interaction system 100 includes multiple user systems 102, each of which hosts multiple applications, including an interaction client 104 and other applications 106. Each interaction client 104 is communicatively coupled, via one or more communication networks (e.g., network 108, which may be the Internet), to other instances of the interaction client 104 (e.g., hosted on respective other user systems 102), an interaction server system 110 and third-party servers 112). An interaction client 104 can also communicate with locally hosted applications 106 using Applications Programming Interfaces (APIs).

Each user system 102 may include a native application, such as the interaction client 104, that is customized for that device's operating system, such as a mobile app on a smartphone or tablet. This mobile app can provide a mechanism for the user system 102 to communicate with the interaction servers 124 hosted on the interaction server system 110. For example, the interaction client 104, and associated application 106 may handle capturing images and videos, providing for editing the same, and streaming or communicating them to the interaction servers 124, via API server 122, for example, for sharing with others and/or for processing augmented reality effects. However, consistent with some embodiments, each user system 102 may use a conventional web browser application to access the various features provided by the interaction servers 124, without requiring installing any native apps on the user system 102. Accordingly, the functionality of the interaction servers 123 can be accessed directly via a standard web browser application 106 using common web protocols like HTTP, WebRTC, and JavaScript. This allows casual users to quickly try out fun effects without needing to locate, download, install, create an account for, and learn how to use a new native app first. The web browser application 106 can access device components of the user system 102, like the camera, through APIs and process effects right in the browser application, allowing users to create and share compelling content entirely through open web standards.

An interaction client 104 interacts with other interaction clients 104 and with the interaction server system 110 via the network 108. The data exchanged between the interaction clients 104 (e.g., interactions 120) and between the interaction clients 104 and the interaction server system 110 includes functions (e.g., commands to invoke functions) and payload data (e.g., text, audio, video, or other multimedia data).

The interaction server system 110 provides server-side functionality via the network 108 to the interaction clients 104. While certain functions of the interaction system 100 are described herein as being performed by either an interaction client 104 or by the interaction server system 110, the location of certain functionality either within the interaction client 104 or the interaction server system 110 may be a design choice. For example, it may be technically preferable to initially deploy particular technology and functionality within the interaction server system 110 but to later migrate this technology and functionality to the interaction client 104 where a user system 102 has sufficient processing capacity.

The interaction server system 110 supports various services and operations that are provided to the interaction clients 104. Such operations include transmitting data to, receiving data from, and processing data generated by the interaction clients 104. This data may include user-generated content items, message content, client device information, geolocation information, media augmentation and overlays, message content persistence conditions, entity relationship information, and live event information. Data exchanges within the interaction system 100 are invoked and controlled through functions available via user interfaces (UIs) of the interaction clients 104.

Turning now specifically to the interaction server system 110, an Application Programming Interface (API) server 122 is coupled to and provides programmatic interfaces to interaction servers 124, making the functions of the interaction servers 124 accessible to interaction clients 104, other applications 106 and third-party server 112. The interaction servers 124 are communicatively coupled to a database server 126, facilitating access to a database 128 that stores data associated with interactions processed by the interaction servers 124. Similarly, a web server 130 is coupled to the interaction servers 124 and provides web-based interfaces to the interaction servers 124. To this end, the web server 130 processes incoming network requests over the Hypertext Transfer Protocol (HTTP) and several other related protocols.

The API server 122 receives and transmits interaction data (e.g., commands and message payloads) between the interaction servers 124 and the user systems 102 (and, for example, interaction clients 104 and other application 106) and the third-party server 112. Specifically, the API server 122 provides a set of interfaces (e.g., routines and protocols) that can be called or queried by the interaction client 104 and other applications 106 to invoke functionality of the interaction servers 124. The API server 122 exposes various functions supported by the interaction servers 124, including account registration; login functionality; the sending of interaction data, via the interaction servers 124, from a particular interaction client 104 to another interaction client 104; the communication of media files (e.g., images or video) from an interaction client 104 to the interaction servers 124; the settings of a collection of media data (e.g., a story); the retrieval of a list of friends of a user of a user system 102; the retrieval of messages and content; the addition and deletion of entities (e.g., friends) to an entity relationship graph (e.g., the entity graph 310); the location of friends within an entity relationship graph; and opening an application event (e.g., relating to the interaction client 104). The interaction servers 124 host multiple systems and subsystems, described below with reference to FIG. 2.

System Architecture

Figure 2:
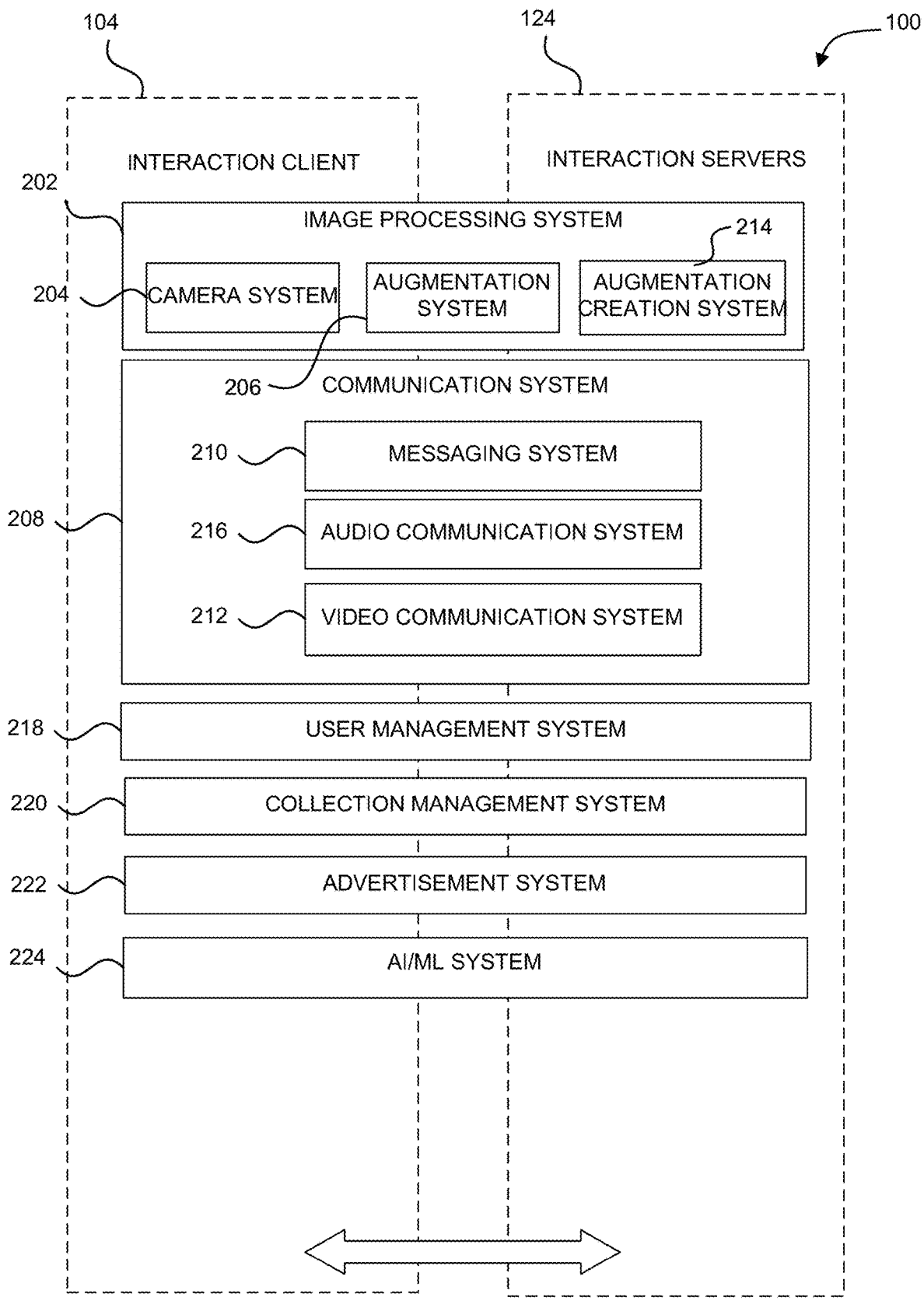
FIG. 2 is a diagrammatic representation of an alternative view of the interaction system having both client-side and server-side functionality, according to some examples.

FIG. 2 is a block diagram illustrating further details regarding the interaction system 100, according to some examples. Specifically, the interaction system 100 is shown to comprise the interaction client 104 and the interaction servers 124. The interaction system 100 embodies multiple subsystems, which are supported on the client-side by the interaction client 104 and on the server-side by the interaction servers 124. In some examples, these subsystems are implemented as microservices. A microservice subsystem (e.g., a microservice application) may have components that enable it to operate independently and communicate with other services. Example components of microservice subsystem may include:

Function logic: The function logic implements the functionality of the microservice subsystem, representing a specific capability or function that the microservice provides.

API interface: Microservices may communicate with each other components through well-defined APIs or interfaces, using lightweight protocols such as REST or messaging. The API interface defines the inputs and outputs of the microservice subsystem and how it interacts with other microservice subsystems of the interaction system 100.

Data storage: A microservice subsystem may be responsible for its own data storage, which may be in the form of a database, cache, or other storage mechanism (e.g., using the database server 126 and database 128). This enables a microservice subsystem to operate independently of other microservices of the interaction system 100.

Service discovery: Microservice subsystems may find and communicate with other microservice subsystems of the interaction system 100. Service discovery mechanisms enable microservice subsystems to locate and communicate with other microservice subsystems in a scalable and efficient way.

Monitoring and logging: Microservice subsystems may need to be monitored and logged in order to ensure availability and performance. Monitoring and logging mechanisms enable the tracking of health and performance of a microservice subsystem.

In some examples, the interaction system 100 may employ a monolithic architecture, a service-oriented architecture (SOA), a function-as-a-service (FaaS) architecture, or a modular architecture. Example subsystems are discussed below.

An image processing system 202 provides various functions that enable a user to capture, edit and augment (e.g., annotate or otherwise modify or vary) media content (e.g., an image or video) associated with a content item or message.

A camera system 204 includes control software (e.g., in a camera application) that interacts with and controls camera hardware (e.g., directly or via operating system controls) of the user system 102 to modify and augment real-time images captured and displayed via the interaction client 104.

The augmentation system 206 provides functions related to the generation and publishing of special effects, including augmentations (e.g., media overlays) for images captured in real-time by cameras of the user system 102 or retrieved from memory of the user system 102. For example, the augmentation system 206 operatively selects, presents, and displays media overlays (e.g., an image filter or special effect) to the interaction client 104 for the augmentation of real-time images received via the camera system 204 or stored images retrieved from memory of a user system 102. These special effects or augmentations are selected by the augmentation system 206 and presented to a user of an interaction client 104, based on a number of inputs and data, such as for example:

Geolocation of the user system 102; and

Entity relationship information of the user of the user system 102.

An augmentation may include audio and visual content and visual effects. Examples of audio and visual content include pictures, texts, logos, animations, and sound effects. An example of a visual effect includes overlaying an image or series of images (e.g., video) with objects of varying colors, and so forth. The audio and visual content or the visual effects can be applied to a content item (e.g., a photo or video) at user system 102 for communication in a message, or applied to video content, such as a video content stream or feed transmitted from an interaction client 104. As such, the image processing system 202 may interact with, and support, the various subsystems of the communication system 208, such as the messaging system 210 and the video communication system 212. Any enhancements, such as the augmentations, may be considered as content understanding signals, and used by the content understanding system to categorize a content item, as described in further detail below.

A media overlay may include text or image data that can be overlaid on top of a photograph taken by the user system 102 or a video stream produced by the user system 102. In some examples, the media overlay may be a location overlay (e.g., Venice beach), a name of a live event, or a name of a merchant overlay (e.g., Beach Coffee House). In further examples, the image processing system 202 uses the geolocation of the user system 102 to identify a media overlay that includes the name of a merchant at the geolocation of the user system 102. The media overlay may include other indicia associated with the merchant. The media overlays may be stored in the databases 128 and accessed through the database server 126. As with augmentations, a media overlay may be considered as a content understanding signal and used by the content understanding system to categorize a content item, as described in further detail below.

The image processing system 202 provides a user-based publication platform that enables users to select a geolocation on a map and upload content items associated with the selected geolocation. The user may also specify circumstances under which a particular media overlay should be offered to other users. The image processing system 202 generates a media overlay that includes the uploaded content and associates the uploaded content with the selected geolocation.

The augmentation creation system 214 supports augmented reality developer platforms and includes an application for content creators (e.g., artists and developers) to create and publish augmentations (e.g., augmented reality experiences) of the interaction client 104. The augmentation creation system 214 provides a library of built-in features and tools to content creators including, for example custom shaders, tracking technology, and templates.

In some examples, the augmentation creation system 214 provides a merchant-based publication platform that enables merchants to select a particular augmentation associated with a geolocation via a bidding process. For example, the augmentation creation system 214 associates a media overlay of the highest bidding merchant with a corresponding geolocation for a predefined amount of time.

A communication system 208 is responsible for enabling and processing multiple forms of communication and interactions within the interaction system 100 and includes a messaging system 210, an audio communication system 216, and a video communication system 212. The messaging system 210 is responsible for enforcing the temporary or time-limited access to content by the interaction clients 104. The messaging system 210 incorporates multiple timers (e.g., within an ephemeral timer system) that, based on duration and display parameters associated with a message or collection of messages (e.g., a story), selectively enable access (e.g., for presentation and display) to messages and associated content via the interaction client 104. The audio communication system 216 enables and supports audio communications (e.g., real-time audio chat) between multiple interaction clients 104. Similarly, the video communication system 212 enables and supports video communications (e.g., real-time video chat) between multiple interaction clients 104.

A user management system 218 is operationally responsible for the management of user data and profiles, and maintains entity information (e.g., stored in an entity table, entity graph and profile data) regarding users and relationships between users of the interaction system 100.

A collection management system 220 is operationally responsible for managing sets or collections of media (e.g., collections of text, image, video, and audio data). A collection of content (e.g., messages, including images, video, text, and audio) may be organized into an "event gallery" or an "event story." Such a collection may be made available for a specified time period, such as the duration of an event to which the content relates. For example, content relating to a music concert may be made available as a "story" for the duration of that music concert. The collection management system 220 may also be responsible for publishing an icon that provides notification of a particular collection to the user interface of the interaction client 104. The collection management system 220 includes a curation function that allows a collection manager to manage and curate a particular collection of content. For example, the curation interface enables an event organizer to curate a collection of content relating to a specific event (e.g., delete inappropriate content or redundant messages). Additionally, the collection management system 220 employs machine vision (or image recognition technology) and content rules to curate a content collection automatically. In certain examples, compensation may be paid to a user to include user-generated content into a collection. In such cases, the collection management system 220 operates to automatically make payments to such users to use their content.

An advertisement system 222 operationally enables the purchasing of advertisements by third parties for presentation to end-users via the interaction clients 104 and also handles the delivery and presentation of these advertisements.

An artificial intelligence and machine learning system 224 provides a variety of services to different subsystems within the interaction system 100. For example, the artificial intelligence and machine learning system 224 operates with the image processing system 202 and the camera system 204 to analyze images and extract information such as objects, text, or faces. This information can be used by the image processing system 202 to enhance, filter, or manipulate images. Similarly, a content understanding system may use this information to assign tags to various content items, where each tag indicates a topic or subject matter to which a content item relates. The artificial intelligence and machine learning system 224 may be used by the augmentation system 206 to generate augmented content and augmented reality experiences, such as adding virtual objects or animations to real-world images. The communication system 208 and messaging system 210 may use the artificial intelligence and machine learning system 224 to analyze communication patterns and provide insights into how users interact with each other and provide intelligent content item and message classification and tagging, such as categorizing messages based on sentiment or topic. The artificial intelligence and machine learning system 224 may also provide chatbot functionality to message interactions 120 between user systems 102 and between a user system 102 and the interaction server system 110. The artificial intelligence and machine learning system 230 may also work with the audio communication system 216 to provide speech recognition and natural language processing capabilities, allowing users to interact with the interaction system 100 using voice commands.

Figure 3:
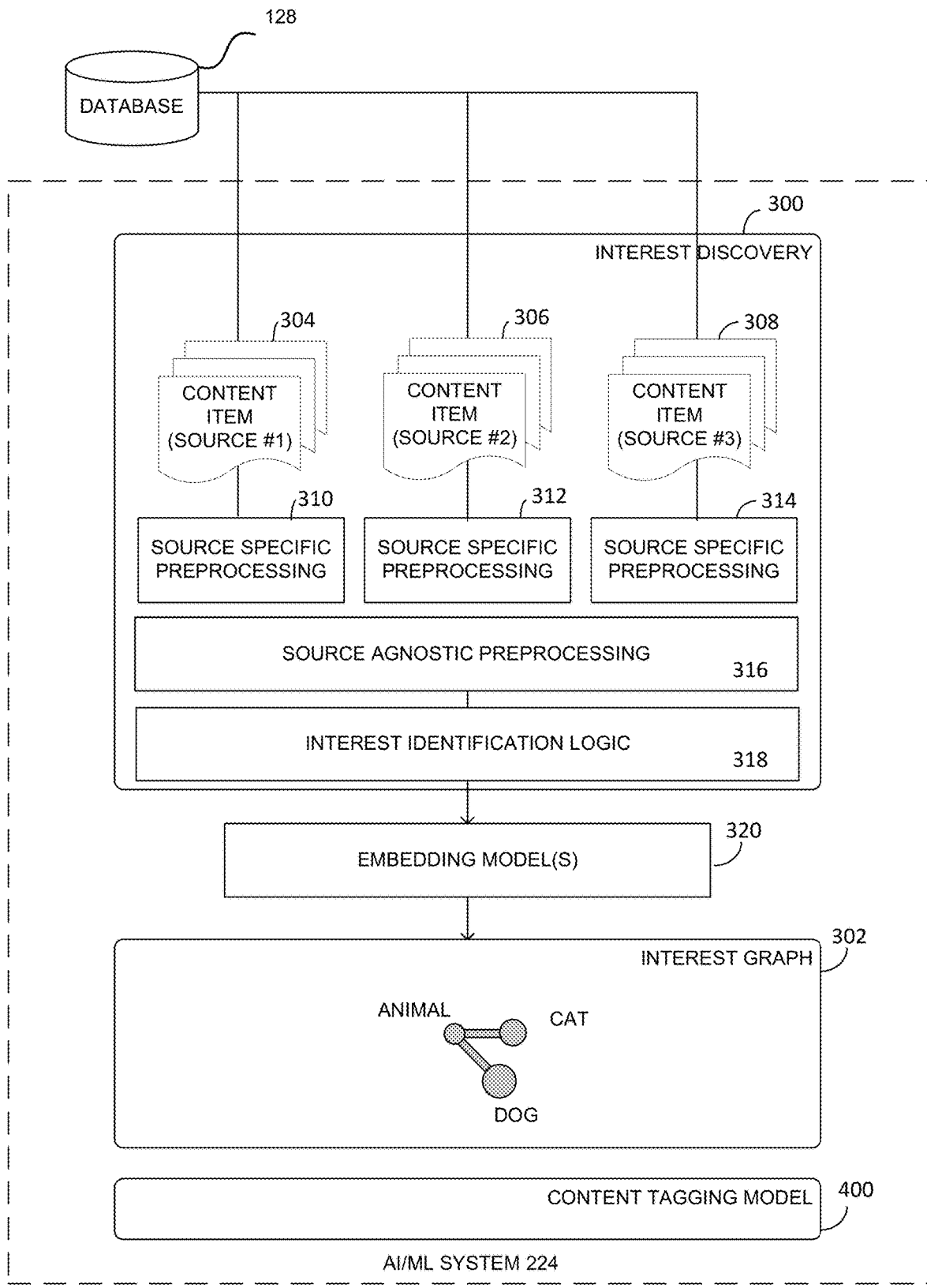
FIG. 3 is a diagram illustrating a view of an artificial intelligence (AI) and machine learning (ML) system, with a detailed view of the interest discovery component used to identify keywords and key phrases, which are then used as input for generating an interest graph, consistent with some examples.

FIG. 3 is a diagram illustrating a view of at least a portion of the AI/ML system 224 (FIG. 2), with a detailed view of the interest discovery logic or component 300 used to identify keywords and key phrases, which are then used as inputs for generating an interest graph 302. To generate the initial interest graph 302, and in some instances, on an on-going basis to refresh the interest graph 302, the system 224 obtains from a database 128 historical content items—that is, content items that were previously posted to and presented via the online platform or service. In this case, content items are obtained from each of multiple different content sources 304, 306, 308 associated with the online platform or service—for example, the interaction server system 110. In some examples, each content source provides content that is in a different format or tends to exhibit different characteristics. For example, a first content distribution source 304 may be associated with a first product offering of the online service and may be primarily user-generated content. A second source of content items 306 may be associated with a second product offering and may have content that differs in format and/or purpose as compared with the content associated with the first content source. For example, content from the first content source may regularly include user-generated hashtags, captions, and text overlays, whereas content from the second content source may be published by platform partners, and may include headlines or titles, but generally lack hashtags and text overlays. In each case, while the format of the content may differ, at least some of the content items include photos and/or videos.

The system 224 applies distinct (e.g., source specific) preprocessing logic to each content source 304, 306, 308 in order to extract textual data from the content items associated with each content source. For a user-generated content source, the preprocessing may involve techniques like splitting hashtags into component words. For example, the hashtag "#foodielife" would be divided into the component words "foodie" and "life". Additional preprocessing for user-generated content includes parsing any captions and overlays associated with the content to extract text. If any user comments are associated with the content items, these user comments are parsed to identify keywords and key phrases.

In contrast, for another content source 306 containing content items from publishing partners, the preprocessing may focus on techniques like extracting article headlines and titles. The bodies of the articles are also parsed to extract text for further processing. These source-specific preprocessing steps 310, 312, and 314 are designed to extract text based on the unique characteristics and formats of each particular content source.

After the source-specific preprocessing is completed, the extracted text from all sources then goes through additional source-agnostic preprocessing 314. This source-agnostic preprocessing 314 consists of steps like parsing text into constituent words and sentences, removing stop words, normalizing word variations to account for alternate spellings, and deduplicating any redundant text. In some examples, the source-agnostic preprocessing may be completed prior to the source-specific preprocessing, as opposed to after. Furthermore, consistent with some examples, some source-agnostic preprocessing may occur before the source-specific preprocessing, while some may occur after. By combining tailored source-specific preprocessing with shared source-agnostic preprocessing, the system is able to maximize the extraction of high-quality textual data from the diverse range of content formats associated with the various content sources.

While FIG. 3 illustrates obtaining content items from three distinct content sources 304, 306, 308, it should be appreciated that this is just one example for the purpose of explanation. The specific number and nature of content sources associated with a given online platform or service may vary depending on the product offerings and the online platform or service. For instance, an alternative configuration may involve obtaining content items from five different content distribution services associated with a platform. Additionally, the characteristics and structured format of content items may differ across platforms. The content obtained from various sources associated with one platform may include a different balance of images, videos, text, captions, headlines, etc. compared to another platform. Regardless of these precise differences, the high-level process involves obtaining content items from multiple sources, where each source provides content that tends to exhibit distinct traits, applies tailored preprocessing tuned to those traits, and ultimately extracts text to feed into downstream interest discovery and graph generation components. While specifics may vary across online platforms, the overall methodology remains applicable.

Consistent with some examples, the extracted text from the source-specific 310, 312 and 314 preprocessing and source-agnostic 316 preprocessing is provided as input into an interest identification logic 318. This interest identification logic 318 applies unsupervised machine learning models to analyze the extracted text corpus and identify salient keywords and key phrases that represent emerging and trending interests and topics. For example, keyword extraction algorithms and topic modeling algorithms may be applied.

In some examples, the interest identification logic 318 leverages unsupervised natural language processing techniques that allow for the discovery of previously unseen keywords and key phrases as new interests and trends emerge. For example, keyword and key phrase extraction algorithms such as RAKE (Rapid Automatic Keyword Extraction) and YAKE! (Yet Another Keyword Extractor) identify statistically salient keywords and key phrases in the text using measures like word frequency and co-occurrence without needing any predefined labels or categories. These algorithms automatically surface niche keywords and key phrases across the diverse textual data.

Additionally, probabilistic topic modeling algorithms including Latent Dirichlet Allocation (LDA) and Non-Negative Matrix Factorization (NMF) discover latent semantic themes and abstract topics purely from word co-occurrence patterns. By relying solely on the statistics of the textual corpus itself, these unsupervised techniques uncover hidden topical patterns and extract representative keywords for each latent topic. As interests shift and evolve over time, additional textual data reflects these changes in word frequencies and co-occurrences. The unsupervised algorithms automatically adapt to detect emerging topics, keywords, and key phrases without any manual updates to predefined taxonomy categories. The algorithms provide self-updating capabilities to keep the interest graph current.

The discovered keywords and key phrases serve as nodes in an interest graph, with connections between nodes that are semantically similar. To construct this graph, the keywords and key phrases are passed into one or more embedding models that encode each textual element as a dense vector representation. Popular semantic embedding models include Word2Vec, GloVe, and BERT, which locate terms sharing semantic meaning near one another in the embedding space. The relative positioning of vectors based on distance encodes the degree of semantic similarity. Words with more contextual and conceptual overlap have embedding vectors that are closer together based on commonality of linguistic contexts in the training corpus.

By leveraging pre-trained embeddings, keywords and key phrases with related meanings are similarly co-located in the embedding space. The interest graph connects keywords and phrases with vector representations in close proximity. In some cases, custom embedding models may be tailored to the specific vocabulary of the platform's content ecosystem for added precision. The embeddings provide a generalized understanding of semantic similarity to link related interests in the graph structure, even for newly emerging or niche topics not seen during model training.

Additionally, behavioral signals indicate interest relationships. Specifically, user co-engagement with content items tagged with particular keywords reveals useful patterns. Frequent co-occurrence of user engagement with "dogs" and "puppies" implies a strong empirical connection between these interests. By encoding both semantic and user co-engagement signals as edge weights, the diverse relationships between interests are represented in the graph structure for matching user preferences.

Consistent with some examples, the interest discovery and graph construction process operate in a continuous iterative loop to incorporate new content in real-time as it is posted to the online platform. As users submit new images and videos as content items, the content understanding pipeline extracts and preprocesses this latest data. The unsupervised keyword and key phrase and topic modeling algorithms analyze the updated corpus to detect novel keywords and phrases reflecting emerging trends. These new interest keywords are vectorized using current word embedding models and added as nodes to the dynamic interest graph. New edges are formed or edge weights updated based on updated co-occurrence and co-engagement statistics. By repeating this process in real-time as new content appears, the interest graph remains perpetually up-to-date and expansive, spanning both enduring and fleeting user interests. The iterative approach ensures the model adapts at the pace of change in user preferences rather than just taking periodic snapshots. The interest graph thus serves as a continuously evolving taxonomy attuned to the platform's shifting zeitgeist.

Figure 4:
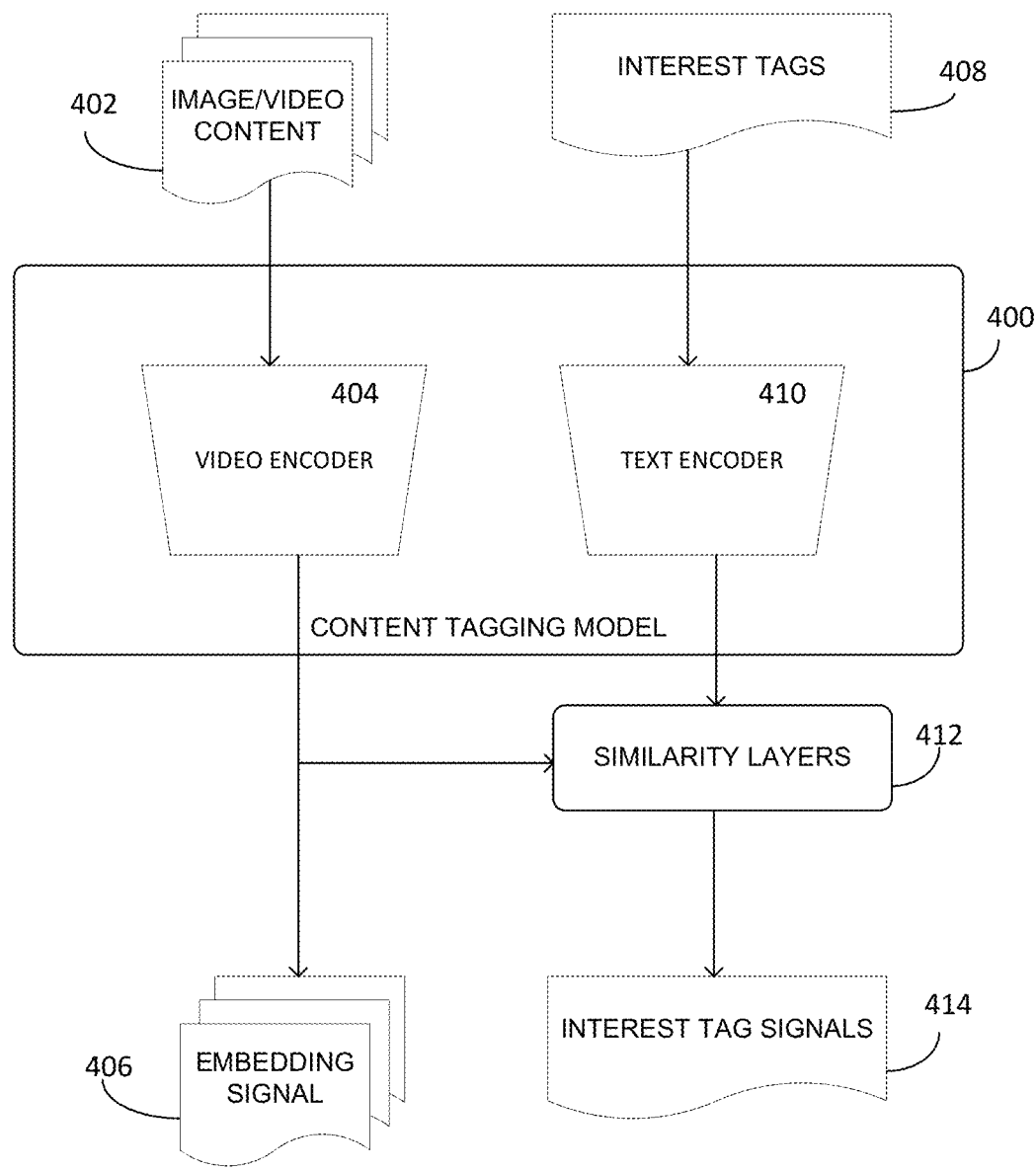
FIG. 4 is a diagram illustrating a content tagging model for use in tagging content items with tags that indicate a topic or subject matter of the content, according to some examples.

FIG. 4 is a diagram illustrating a content tagging model 400 for use in tagging content items with tags that indicate a topic or subject matter of the content, according to some examples. With the expansive interest graph constructed through unsupervised learning techniques, the next phase involves developing a specialized machine learning approach for tagging newly submitted visual content with relevant interest categories (e.g., nodes in the interest graph). Specifically, a pairwise framework is leveraged for the automated annotation of images and videos based on the textual descriptors (keywords and key phrases) from the interest graph. This approach aims to overcome scalability challenges of conventional multi-class classifiers given the massive scale and specificity of the interest graph. The pairwise architecture relates visual features extracted from visual content (e.g., images and videos) 402 with semantic text embeddings of interest tags 408 for each interest type through cross-modality understanding techniques. By scoring the similarity of content representations against interest descriptors, the model identifies pertinent taxonomic categories to tag each item submitted to the platform. The following sections describe the training methodology and inference process of the pairwise model for interest-based tagging of user-generated visual content.

Consistent with some examples, one or more existing foundation models, like CLIP (Contrastive Language-Image Pretraining) or CoCa (Contrastive Captioner) may be leveraged. These models are designed specifically for vision-to-text tasks. They are pretrained on large datasets to relate images and videos with corresponding textual descriptions. These models contain two primary encoder components: a visual encoder like a Convolutional Neural Network (CNN) that processes visual content, and a text encoder like a Transformer that encodes sentences and phrases. Additional similarity layers measure alignment between visual and text embeddings.

To train a pairwise content tagging model 400 for interest-based tagging, the text encoder 410 is provided with keywords and key phrases (e.g., interest tags 408) from the interest graph to output text embeddings. The visual encoder 404 processes images and videos 402 from the platform to output visual embeddings (e.g., embedding signals 406). These dual encoders map the inputs into a common semantic space where related visual and textual elements have closer embedding proximity.

The model is trained on matching pairs of images/videos and corresponding interest descriptors extracted from accompanying text. This "teaches" the encoders to map relevant visual and textual concepts close together in the embedding space. Random non-matching pairs are also used to push apart unrelated concepts. The contrastive loss optimizes this separation distance between positive and negative pairs. Through multiple training iterations, the model learns to embed visual content and text in a relational way that reflects semantic connections.

A diverse and comprehensive training dataset is used to teach the pairwise model the associations between visual content and interest categories. This dataset can be prepared by leveraging the platform's corpus of previously posted images, videos, and other content items. Specifically, relevant interest tags are extracted from the text accompanying each historical item, including captions, hashtags, titles, comments, etc. Advanced natural language processing techniques like named entity recognition and part-of-speech tagging can be used to accurately identify pertinent keywords and key phrases within the unstructured text.

These extracted keywords and key phrases are matched against the nodes of the interest graph to select corresponding categories that describe the aboutness of the content item. For example, a video of someone walking their dog may extract the keywords "dog" and "pet" from the caption which match concepts in the taxonomy. Each historical content item is paired with the relevant interest tags mined from its textual metadata, forming the initial training dataset.

Additional data augmentation techniques may be employed to boost the diversity of image-text training pairs. These include image variations like horizontal flips, color shifts, crops, and visual effects, coupled with textual augmentations based on synonyms, hypernyms, and paraphrases. Together, these techniques generate a large-scale training dataset covering the span of the interest graph with historical content examples representative of the platform's visual ecosystem.

The model includes specialized similarity layers 412 designed to compare and relate the visual embeddings 406 and text embeddings 414. Specifically, these layers 412 calculate a similarity score between each visual content embedding and text tag embedding to quantify their degree of correspondence. Various similarity functions may be used such as cosine similarity which measures the angular distance between vectors. A higher score denotes greater alignment between the visual and textual elements in the joint embedding space.

During training, the similarity layers and loss calculations push matched pairs closer while separating non-matches. This contrastive approach learns complex associations between elements like visual patterns and abstract concepts. For instance, the model relates embeddings for image features representing "golden fur" and "wagging tail" with the text embedding for "happy dog" based on contextual co-occurrence. These layers effectively act as a bridge enabling cross-modality understanding between vision and language. Once trained, the model can tag new images and videos by determining the most relevant interest categories from the interest graph based solely on visual patterns, without needing descriptive text. Specifically, the visual encoder generates an embedding 406 representing the visual features of the new image or video 402. The similarity layers 412 then calculate scores between this visual embedding 406 and the text embeddings 414 of each interest tag node from the graph. The tags with the highest similarity scores, indicating closest proximity in the joint embedding space, are selected to tag the content. The model identifies pertinent tags by assessing which textual descriptors from the interest graph have embeddings most aligned with the embedding of the visual input, quantifying semantic visual-textual relationships learned during training.

Various techniques can be employed to select the specific tags associated with a given image or video based on the similarity scores. One approach is to choose the top "N" tags exceeding some predefined threshold, where "N" may be an integer between 3 and 10, as an example. For instance, if N=5 and the threshold is set at 0.7, the 5 tags with the highest similarity scores above 0.7 will be selected. For an input image of a dog catching a frisbee that receives scores of [Dog: 0.95, Pet: 0.81, Golden Retriever: 0.78, Catch: 0.72, Toy: 0.68, Play: 0.65, Animal: 0.55], the selected tags would be [Dog, Pet, Golden Retriever, Catch, Toy]. The optimal values for "N" and the threshold can be tuned based on the desired tagging precision versus coverage trade-off. This top-N thresholding approach provides a simple and customizable method for tag selection.

Figure 5:
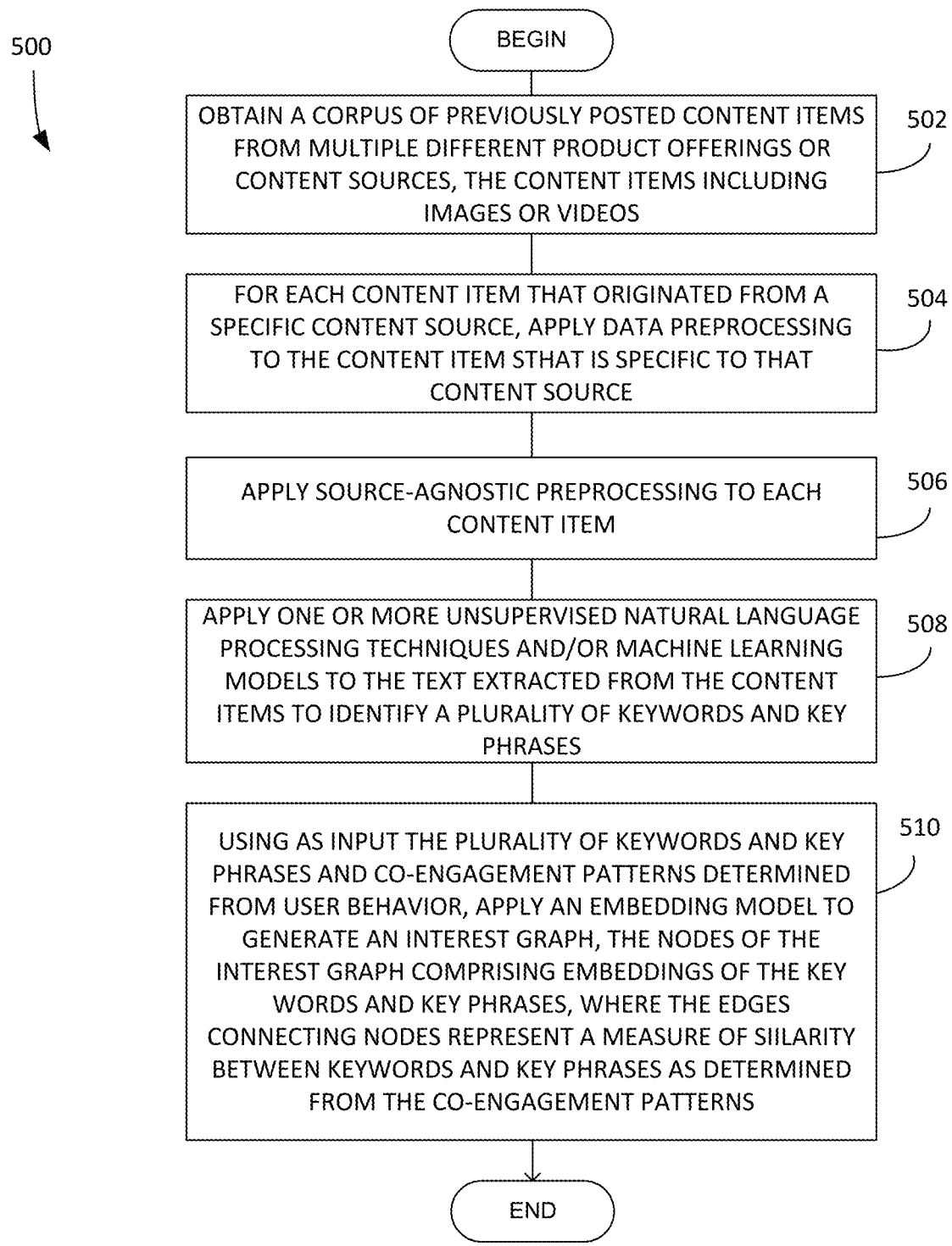
FIG. 5 is a flow diagram illustrating an example of operations performed as part of a method for generating an interest taxonomy or interest graph, having nodes representing keywords and key phrases connected by edges denoting semantic similarity determined from contextual word embeddings and co-engagement patterns, according to some examples.

FIG. 5 is a flow diagram illustrating an example of operations performed as part of a method for creating, and iteratively updating, an interest graph, according to some examples. The process begins, at operation 502, by obtaining a corpus of user-generated content items that were previously posted to various services of an online platform. Specifically, a plurality of photos, videos, and other multimedia content items are collected from each distinct content source associated with the platform. These content sources represent different product offerings, content distribution channels, or user-facing features of the online platform. For example, content items may be obtained from a short-form video feed, a photo-sharing service, a messaging platform, an advertisements database, or other services hosted by the online platform. Each content item comprises a photo, video, or other visual media, and may be accompanied by additional metadata provided by the posting user. This additional data includes captions, hashtags, titles, comments, and other textual information added when the content was initially posted. The content corpus aggregates these user-generated content items spanning the various content sources and formats available across the online platform.

Next, at operations 504, customized preprocessing is applied to extract text from the content items associated with each unique source. This includes both source-specific preprocessing tailored to each content format as well as additional source-agnostic preprocessing, for example at operation 506. After aggregating the content corpus, customized preprocessing is applied to extract text from the items associated with each unique content source. This preprocessing involves both source-specific logic tailored to the format of each source, as well as additional source-agnostic preprocessing. For example, content items from a short-form video feed may contain slang terms and abbreviations in overlays and captions. Therefore, source-specific preprocessing for this content source involves expanding shortened text to the complete forms. In contrast, content from publishing partners typically has cleanly formatted article headlines and bodies. Thus, minimal source-specific preprocessing is required, beyond stripping the article text. Although shown in FIG. 5 as occurring in order, source-agnostic preprocessing 506 may occur before, after, or intermittently with source-specific preprocessing steps 504. Common source-agnostic techniques include parsing all extracted text into constituent words and sentences, removing extraneous whitespace and punctuation, normalizing word variations, eliminating duplicate text, and filtering out stop words. By combining customized source-specific preprocessing with generalized source-agnostic preprocessing, maximum extraction of high-quality textual data is achieved despite the diversity of content formats.

At method operation 508, the extracted text is then fed into an interest discovery component that leverages natural language processing and unsupervised machine learning models to analyze the text and identify salient keywords and key phrases representing trending topics and interests. The preprocessed text extracted from all content sources undergoes interest discovery analysis. This analysis applies unsupervised machine learning models to the aggregate text corpus to identify salient keywords and key phrases representing trending topics and niche interests. For example, keyword extraction algorithms like RAKE, TextRank, and TopicRank may be leveraged to determine keywords and key phrases that are unusually frequent in specific content items but not across the entire corpus. This allows identification of distinctive keywords percolating around emerging trends. Additionally, topic modeling approaches including Latent Dirichlet Allocation, Non-Negative Matrix Factorization, and Biterm Topic Modeling can discover latent semantic themes spanning the corpus. By clustering words that commonly co-occur, these algorithms reveal overarching topics and highlight the most relevant words per topic. For instance, topic models may discover an anime-related theme encompassing terms like "manga", "cosplay", "Studio Ghibli", etc. The keywords and key phrases extracted through these unsupervised techniques form the foundation of the interest graph's taxonomy. Compared to manual human-curated taxonomies, this automated discovery process enables continuous adaptation to evolving interests and content categories that organically develop within the platform's dynamic media ecosystem.

Finally, at operation 510, the extracted and identified keywords and key phrases are used to construct nodes of an interest graph. Edges are created between nodes based on semantic similarity, determined using word embeddings, as well as co-engagement patterns in user behavior data. The salient keywords and key phrases extracted through interest discovery provide the foundation for constructing nodes of the interest graph. Specifically, the keywords and key phrases are encoded into dense vector representations via an embedding model. Popular semantic embedding techniques like Word2Vec, GloVe, and BERT may be leveraged to encode words and phrases into a high-dimensional embedding space. The relative positioning of vectors in this space encodes semantic similarity, with more related terms having closer vector representations. Custom embedding models tailored to the platform's vocabulary may also be trained on aggregated text from content metadata. Beyond semantic similarity, additional edges are created between nodes based on co-engagement patterns in historical user behavior data. For example, if users frequently view or share content tagged with both "kittens" and "cat videos", this implies a strong co-occurrence relationship despite limited textual overlap. Thus, behavioral data reveals supplemental relatedness patterns beyond semantic similarity. The resulting graph structure powered by embeddings and co-engagement metrics constitutes a rich, expansive taxonomy with nodes spanning granular interests and edges encoding multi-faceted relationships between interests. Compared to limited human-curated taxonomies, this data-driven graph provides wider coverage of niche topics that organically emerge from the platform's media ecosystem and user community.

The resulting graph structure, powered by unsupervised learning, constitutes a rich, dynamic, and comprehensive taxonomy of interests. The described technique for automated discovery and creation of an expansive interest graph provides significant technical advantages over conventional taxonomy construction approaches. Specifically, leveraging unsupervised learning on diverse user-generated content enables continuous incorporation of emerging niche interests rather than relying solely on historical popularity patterns. This allows the taxonomy to remain dynamic and reactive to trend shifts. Additionally, the graph structure powered by contextualized embeddings provides nuanced multi-faceted relatedness metrics, as opposed to simplistic hierarchies in traditional taxonomies. This supports granular personalized understandings of individual interests. Further, the proposed behavioral data integration supplements pure text-based signals for a comprehensive perspective. Finally, automated extraction of thousands of granular interests from large-scale decentralized content enables taxonomy coverage that far surpasses the scale feasible for human curation. Together, these advantages deliver an interest graph with greater depth, adaptability, semantic richness, and coverage compared to existing content taxonomies. The graph serves as a next-generation foundation for personalized content understanding.

Figure 6A:
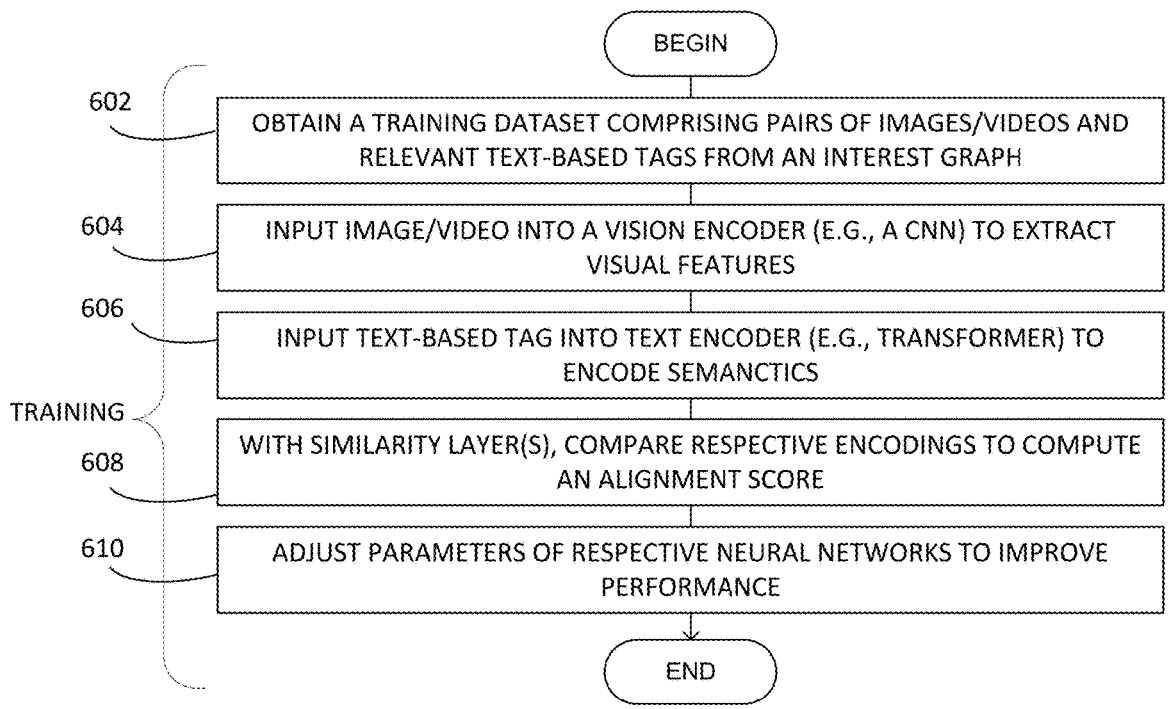
FIGS. 6A and 6B are flow diagrams illustrating examples of operations performed as part of a method for training a pairwise model to generate similarity scores for visual content and textual description pairs, and then using the model to tag new content items with tags that correspond with interest categories represented in an interest graph, according to some embodiments.
Figure 6B:
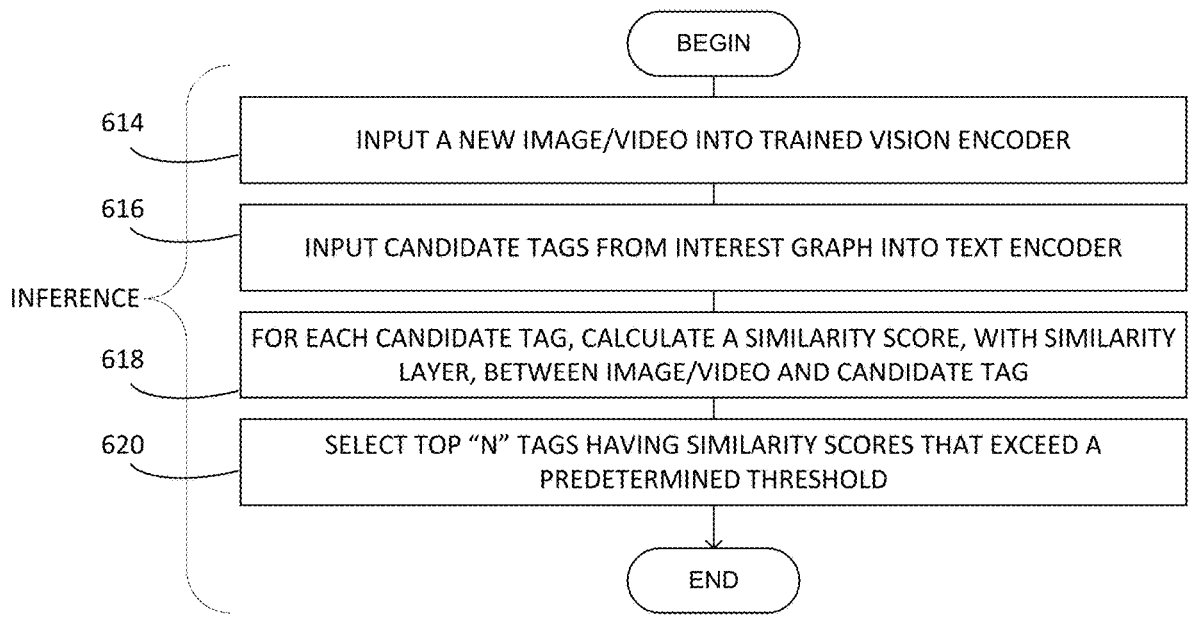

FIGS. 6A and 6B are flow diagrams illustrating examples of operations performed as part of a method for training a pairwise model to generate similarity scores for visual content and textual description pairs, and then using the model to tag new content items with tags that correspond with interest categories represented in the interest graph, according to some embodiments. At operation 602, a training dataset comprising pairs of images/videos and relevant text-based tags is obtained. In some examples, this dataset is prepared by collecting images, videos, and any associated text, including captions, hashtags, titles, comments, etc. that were previously posted by users. The text is preprocessed to extract salient keywords and key phrases which are mapped to nodes in the interest graph, representing candidate tags. Images and videos are paired with their relevant tags mined from accompanying text to form positive training examples. Additionally, non-matching image/video and tag pairs from the interest graph are added as negative examples.

At operation 604, the image/video portion of each training pair is input into a vision encoder such as a Convolutional Neural Network (CNN) in order to extract and encode visual features. The CNN analyzes the pixel values of the images/video frames to detect visual patterns and constructs hierarchical feature representations. Lower layers identify simple patterns like edges and textures while deeper layers assemble these into more complex concepts. The output is an embedding vector summarizing the salient visual features. Simultaneously, at operation 606, the text-based tag is processed by a text encoder such as a Transformer to encode the semantic meaning of the keywords or key phrases into an embedding vector. The text encoder analyzes syntactic and contextual relationships between words to construct a rich representation capturing multiple facets of linguistic meaning. The dual encoders map the visual and textual inputs into a common embedding space for comparison.

At operation 608, the similarity layers, which may apply additional transformations on the embeddings, compare the visual and textual embeddings by calculating metrics like cosine similarity to determine their degree of correspondence and alignment in the joint embedding space. In some examples, this produces a scalar similarity score for each image/text tag pair. At operation 610, a contrastive loss function is applied that explicitly minimizes the distance between positive pairs while maximizing the distance between negative pairs, bringing matched pairs closer together and pushing non-matches further apart in the embedding space. The encoders' parameters are updated through backpropagation to optimize this loss, enhancing the model's ability to relate aligned visual and textual concepts.

Once training is complete, the content tagging model can be deployed to tag new visual content during the inference stage. As shown in FIG. 6B, at operation 614, a new image or video is input into the trained vision encoder to obtain an embedding representation summarizing its salient visual features. Additionally, a candidate tag from the set of keywords and key phrases from the interest graph is passed into the text encoder, at operation 616.

At operation 618, the similarity layers, which may apply additional transformations on the embeddings, compare the visual content embedding and the individual text tag embedding by calculating metrics like cosine similarity to determine their degree of correspondence in the joint embedding space (618). This produces a scalar similarity score indicating how well the visual features align with the semantic meaning of each candidate tag.

At operation 620, some predetermined top highest ranking number ("N") of tags are selected based on their similarity scores exceeding a predefined threshold value. The predetermined number, "N" may be an integer such as between 3 and 10, and the threshold set appropriately to trade off precision and coverage. For example, if N=5 and the threshold is 0.7, the 5 tags with scores above 0.7 will be chosen. This selection criteria ensures that only the most relevant tags whose semantic meaning closely aligns with the visual content embedding get assigned to the image/video. The tags effectively annotate the content by identifying pertinent topics and subjects represented in the interest graph taxonomy.

The tags assigned to a visual content item (e.g., an image or video) can be aggregated with other available data about the overall content item, such as captions, overlays, comments, geolocation, posting user ID, etc. This aggregated data creates a rich representation of the content item. Separately, user interests are derived by analyzing a user's historical engagement patterns with previously tagged content. For example, if a user frequently views or shares content tagged with "dogs" and "puppies", this suggests an interest in those topics. To match users with relevant new content, the aggregated tag and metadata representation of a content item is compared against the derived user interest profile. Content whose topic tags and other attributes align with a user's interests can thus be effectively recommended.

The pairwise model architecture provides significant advantages over conventional multi-class classification for tagging visual content, especially when combined with the expansive interest graph taxonomy. The model requires far less training data, since positive examples are only needed for a subset of image/text pairs rather than every single class. This enables coverage of the extensive taxonomy within a feasible training budget. Additionally, the semantic text embeddings allow zero-shot generalization to unseen niche tags in the graph. Furthermore, the interest graph's dynamic adaptation and granular coverage of emerging trends supply diverse and fresh tag concepts to the model, bolstering its tagging precision. Together, the pairwise approach and evolving interest graph facilitate accurate, nuanced, and scalable tagging of diverse user-generated visual content.

Machine Architecture

Figure 7:
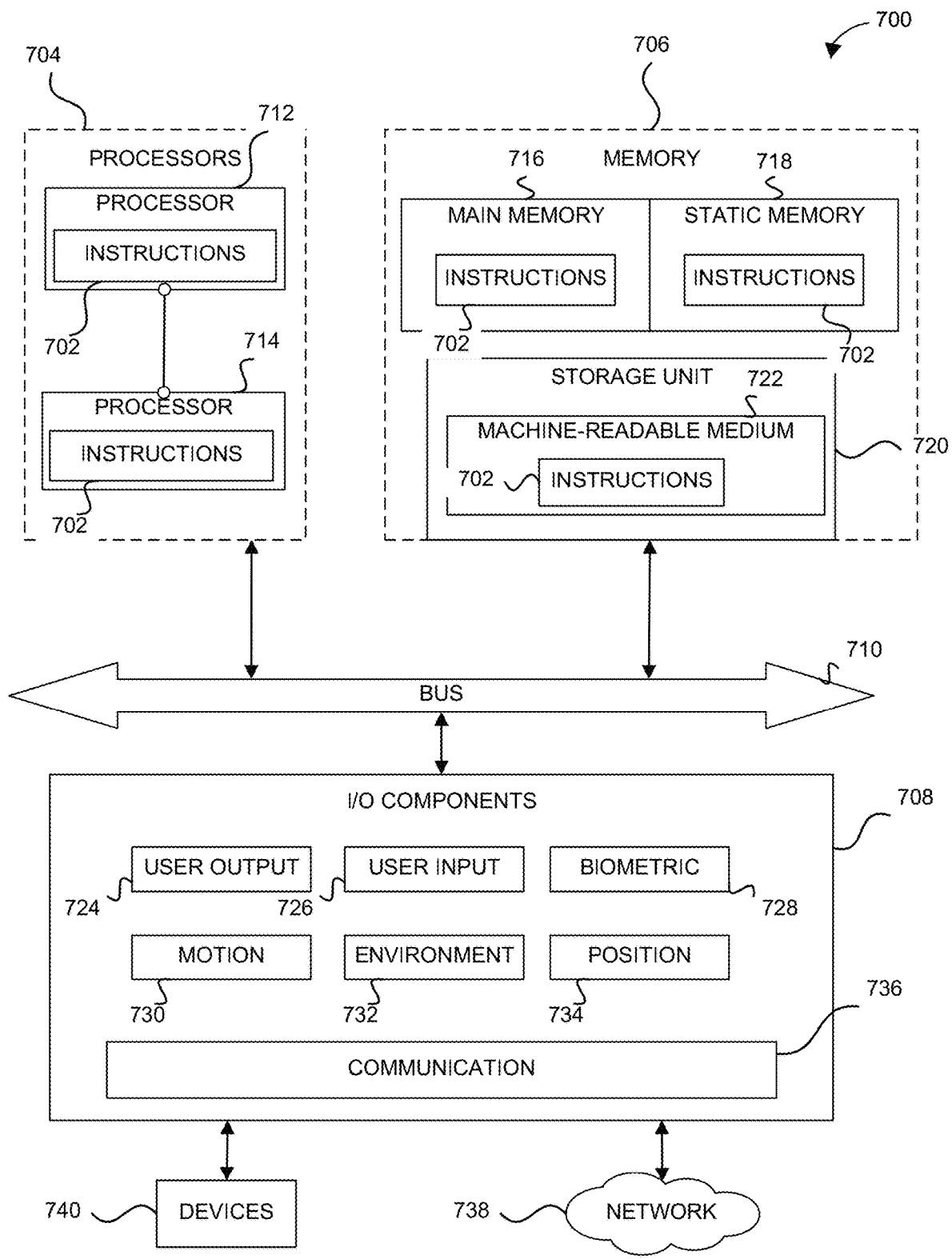
FIG. 7 is a block diagram illustrating a machine architecture for a machine that can be programmed to perform the various methodologies described and claimed herein.

FIG. 7 is a diagrammatic representation of the machine 700 within which instructions 702 (e.g., software, a program, an application, an applet, an app, or other executable code) for causing the machine 700 to perform any one or more of the methodologies discussed herein may be executed. For example, the instructions 702 may cause the machine 700 to execute any one or more of the methods described herein. The instructions 702 transform the general, non-programmed machine 700 into a particular machine 700 programmed to carry out the described and illustrated functions in the manner described. The machine 700 may operate as a standalone device or may be coupled (e.g., networked) to other machines. In a networked deployment, the machine 700 may operate in the capacity of a server machine or a client machine in a server-client network environment, or as a peer machine in a peer-to-peer (or distributed) network environment. The machine 700 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smartphone, a mobile device, a wearable device (e.g., a smartwatch), a smart home device (e.g., a smart appliance), other smart devices, a web appliance, a network router, a network switch, a network bridge, or any machine capable of executing the instructions 702, sequentially or otherwise, that specify actions to be taken by the machine 700. Further, while a single machine 700 is illustrated, the term "machine" shall also be taken to include a collection of machines that individually or jointly execute the instructions 702 to perform any one or more of the methodologies discussed herein. The machine 700, for example, may comprise the user system 102 or any one of multiple server devices forming part of the interaction server system 110. In some examples, the machine 700 may also comprise both client and server systems, with certain operations of a particular method or algorithm being performed on the server-side and with certain operations of the particular method or algorithm being performed on the client-side.

The machine 700 may include processors 704, memory 706, and input/output I/O components 708, which may be configured to communicate with each other via a bus 710. In an example, the processors 704 (e.g., a Central Processing Unit (CPU), a Reduced Instruction Set Computing (RISC) Processor, a Complex Instruction Set Computing (CISC) Processor, a Graphics Processing Unit (GPU), a Digital Signal Processor (DSP), an Application Specific Integrated Circuit (ASIC), a Radio-Frequency Integrated Circuit (RFIC), another processor, or any suitable combination thereof) may include, for example, a processor 712 and a processor 714 that execute the instructions 702. The term "processor" is intended to include multi-core processors that may comprise two or more independent processors (sometimes referred to as "cores") that may execute instructions contemporaneously. Although FIG. 7 shows multiple processors 704, the machine 700 may include a single processor with a single-core, a single processor with multiple cores (e.g., a multi-core processor), multiple processors with a single core, multiple processors with multiples cores, or any combination thereof.

The memory 706 includes a main memory 716, a static memory 718, and a storage unit 720, both accessible to the processors 704 via the bus 710. The main memory 706, the static memory 718, and storage unit 720 store the instructions 702 embodying any one or more of the methodologies or functions described herein. The instructions 702 may also reside, completely or partially, within the main memory 716, within the static memory 718, within machine-readable medium 722 within the storage unit 720, within at least one of the processors 704 (e.g., within the processor's cache memory), or any suitable combination thereof, during execution thereof by the machine 700.

The I/O components 708 may include a wide variety of components to receive input, provide output, produce output, transmit information, exchange information, capture measurements, and so on. The specific I/O components 708 that are included in a particular machine will depend on the type of machine. For example, portable machines such as mobile phones may include a touch input device or other such input mechanisms, while a headless server machine will likely not include such a touch input device. It will be appreciated that the I/O components 708 may include many other components that are not shown in FIG. 7. In various examples, the I/O components 708 may include user output components 724 and user input components 726. The user output components 724 may include visual components (e.g., a display such as a plasma display panel (PDP), a light-emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The user input components 726 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and force of touches or touch gestures, or other tactile input components), audio input components (e.g., a microphone), and the like.

In further examples, the I/O components 708 may include biometric components 728, motion components 730, environmental components 732, or position components 734, among a wide array of other components. For example, the biometric components 728 include components to detect expressions (e.g., hand expressions, facial expressions, vocal expressions, body gestures, or eye-tracking), measure biosignals (e.g., blood pressure, heart rate, body temperature, perspiration, or brain waves), identify a person (e.g., voice identification, retinal identification, facial identification, fingerprint identification, or electroencephalogram-based identification), and the like. The biometric components may include a brain-machine interface (BMI) system that allows communication between the brain and an external device or machine. This may be achieved by recording brain activity data, translating this data into a format that can be understood by a computer, and then using the resulting signals to control the device or machine.

Example types of BMI technologies, including:

Electroencephalography (EEG) based BMIs, which record electrical activity in the brain using electrodes placed on the scalp.

Invasive BMIs, which used electrodes that are surgically implanted into the brain.

Optogenetics BMIs, which use light to control the activity of specific nerve cells in the brain.

Any biometric data collected by the biometric components is captured and stored only with user approval and deleted on user request. Further, such biometric data may be used for very limited purposes, such as identification verification. To ensure limited and authorized use of biometric information and other personally identifiable information (PII), access to this data is restricted to authorized personnel only, if at all. Any use of biometric data may strictly be limited to identification verification purposes, and the data is not shared or sold to any third party without the explicit consent of the user. In addition, appropriate technical and organizational measures are implemented to ensure the security and confidentiality of this sensitive information.

The motion components 730 include acceleration sensor components (e.g., accelerometer), gravitation sensor components, rotation sensor components (e.g., gyroscope).

The environmental components 732 include, for example, one or cameras (with still image/photograph and video capabilities), illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment.

With respect to cameras, the user system 102 may have a camera system comprising, for example, front cameras on a front surface of the user system 102 and rear cameras on a rear surface of the user system 102. The front cameras may, for example, be used to capture still images and video of a user of the user system 102 (e.g., "selfies"), which may then be augmented with augmentation data (e.g., filters) described above. The rear cameras may, for example, be used to capture still images and videos in a more traditional camera mode, with these images similarly being augmented with augmentation data. In addition to front and rear cameras, the user system 102 may also include a 360° camera for capturing 360° photographs and videos.

Further, the camera system of the user system 102 may include dual rear cameras (e.g., a primary camera as well as a depth-sensing camera), or even triple, quad or penta rear camera configurations on the front and rear sides of the user system 102. These multiple cameras systems may include a wide camera, an ultra-wide camera, a telephoto camera, a macro camera, and a depth sensor, for example.

The position components 734 include location sensor components (e.g., a GPS receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 708 further include communication components 736 operable to couple the machine 700 to a network 738 or devices 740 via respective coupling or connections. For example, the communication components 736 may include a network interface component or another suitable device to interface with the network 738. In further examples, the communication components 736 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 740 may be another machine or any of a wide variety of peripheral devices (e.g., a peripheral device coupled via a USB).

Moreover, the communication components 736 may detect identifiers or include components operable to detect identifiers. For example, the communication components 736 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph™, MaxiCode, PDF417, Ultra Code, UCC RSS-2D bar code, and other optical codes), or acoustic detection components (e.g., microphones to identify tagged audio signals). In addition, a variety of information may be derived via the communication components 736, such as location via Internet Protocol (IP) geolocation, location via Wi-Fi® signal triangulation, location via detecting an NFC beacon signal that may indicate a particular location, and so forth.

The various memories (e.g., main memory 716, static memory 718, and memory of the processors 704) and storage unit 720 may store one or more sets of instructions and data structures (e.g., software) embodying or used by any one or more of the methodologies or functions described herein. These instructions (e.g., the instructions 702), when executed by processors 704, cause various operations to implement the disclosed examples.

The instructions 702 may be transmitted or received over the network 738, using a transmission medium, via a network interface device (e.g., a network interface component included in the communication components 736) and using any one of several well-known transfer protocols (e.g., hypertext transfer protocol (HTTP)). Similarly, the instructions 702 may be transmitted or received using a transmission medium via a coupling (e.g., a peer-to-peer coupling) to the devices 740.

Software Architecture

Figure 8:
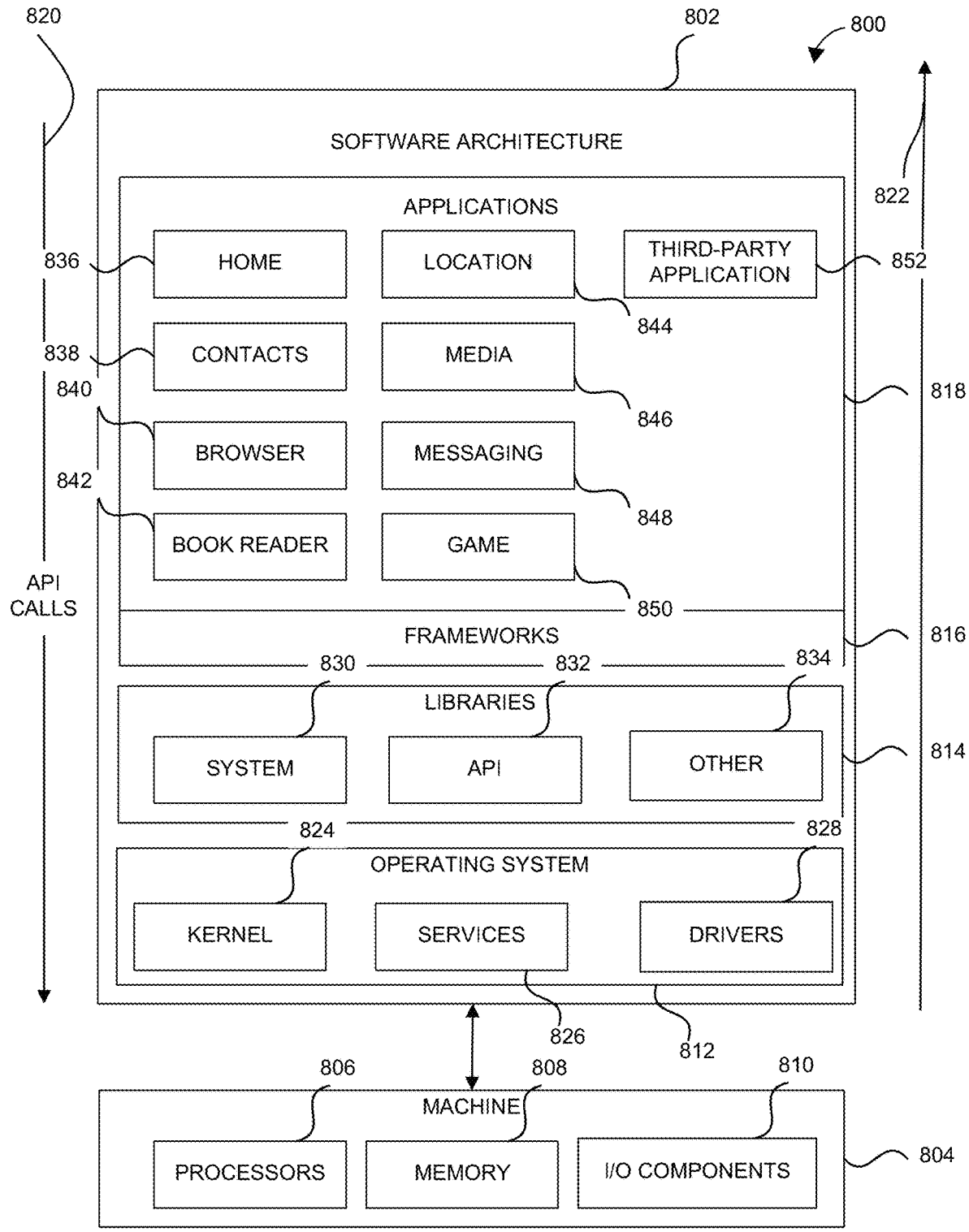
FIG. 8 is a diagram illustrating a software architecture depicting the various layers such as applications, frameworks, libraries, services, drivers and instructions that are installed on a machine to enable the methodologies described and claimed herein.

FIG. 8 is a block diagram 800 illustrating a software architecture 804, which can be installed on any one or more of the devices described herein. The software architecture 804 is supported by hardware such as a machine 802 that includes processors 820, memory 826, and I/O components 838. In this example, the software architecture 804 can be conceptualized as a stack of layers, where individual layers provides a particular functionality. The software architecture 804 includes layers such as an operating system 812, libraries 808, frameworks 810, and applications 806. Operationally, the applications 806 invoke API calls 850 through the software stack and receive messages 852 in response to the API calls 850.

The operating system 812 manages hardware resources and provides common services. The operating system 812 includes, for example, a kernel 814, services 816, and drivers 522. The kernel 814 acts as an abstraction layer between the hardware and the other software layers. For example, the kernel 814 provides memory management, processor management (e.g., scheduling), component management, networking, and security settings, among other functionalities. The services 816 can provide other common services for the other software layers. The drivers 822 are responsible for controlling or interfacing with the underlying hardware. For instance, the drivers 822 can include display drivers, camera drivers, BLUETOOTH® or BLUETOOTH® Low Energy drivers, flash memory drivers, serial communication drivers (e.g., Universal Serial Bus (USB) drivers), WI-FI® drivers, audio drivers, power management drivers, and so forth.

The libraries 808 provide a low-level common infrastructure used by the applications 806. The libraries 808 can include system libraries 818 (e.g., C standard library) that provide functions such as memory allocation functions, string manipulation functions, mathematic functions, and the like. In addition, the libraries 808 can include API libraries 824 such as media libraries (e.g., libraries to support presentation and manipulation of various media formats such as Moving Picture Experts Group-4 (MPEG4), Advanced Video Coding (H.264 or AVC), Moving Picture Experts Group Layer-3 (MP3), Advanced Audio Coding (AAC), Adaptive Multi-Rate (AMR) audio codec, Joint Photographic Experts Group (JPEG or JPG), or Portable Network Graphics (PNG)), graphics libraries (e.g., an OpenGL framework used to render in two dimensions (2D) and three dimensions (3D) graphic content on a display, GLMotif used to implement 3D user interfaces), image feature extraction libraries (e.g. OpenIMAJ), database libraries (e.g., SQLite to provide various relational database functions), web libraries (e.g., WebKit to provide web browsing functionality), and the like. The libraries 808 can also include a wide variety of other libraries 828 to provide many other APIs to the applications 806.

The frameworks 810 provide a high-level common infrastructure that is used by the applications 806. For example, the frameworks 810 provide various graphical user interface (GUI) functions, high-level resource management, and high-level location services. The frameworks 810 can provide a broad spectrum of other APIs that can be used by the applications 806, some of which may be specific to a particular operating system or platform.

In an example, the applications 806 may include a home application 836, a contacts application 830, a browser application 832, a book reader application 834, a location application 842, a media application 844, a messaging application 846, a game application 848, and a broad assortment of other Applications such as third-party applications 840. The applications 806 are programs that execute functions defined in the programs. Various programming languages can be employed to create one or more of the applications 806, structured in a variety of manners, such as object-oriented programming languages (e.g., Objective-C, Java, or C++) or procedural programming languages (e.g., C or assembly language). In a specific example, the third-party applications 840 (e.g., Applications developed using the ANDROID™ or IOS™ software development kit (SDK) by an entity other than the vendor of the particular platform) may be mobile software running on a mobile operating system such as IOS™, ANDROID™, WINDOWS® Phone, or another mobile operating system. In this example, the third-party applications 840 can invoke the API calls 850 provided by the operating system 812 to facilitate functionality described herein.

EXAMPLES

Example 1 is a computer-implemented method comprising: obtaining a plurality of content items from each content delivery source of a plurality of content delivery sources of an online platform, each content delivery source having content items in a different content format; applying distinct preprocessing steps to the content items from each content delivery source to extract text from the plurality of content items; identifying from the text extracted from the content items a plurality of keywords and key phrases; and constructing an interest graph from the plurality of keywords and key phrases, the interest graph having as nodes a vector representation of a keyword or key phrase, and having edges connecting nodes, wherein the edges represent a measure of similarity between connected nodes.

In Example 2, the subject matter of Example 1 includes, wherein the distinct preprocessing steps applied to content items from a first content delivery source comprise: identifying one or more hashtags in the content items from the first content delivery source; separating each hashtag into individual words; and adding the separated words to the text extracted from the content items from the first content delivery source.

In Example 3, the subject matter of Examples 1-2 includes, wherein the distinct preprocessing steps applied to content items from a second content delivery source comprise: identifying a heading or title associated with a content item from the second content delivery source; extracting text from the identified heading or title; and adding the extracted text to the text extracted from the content items from the second content delivery source.

In Example 4, the subject matter of Examples 1-3 includes, for each content item from the plurality of content delivery sources that includes a video clip, processing the video clip using speech-to-text transcription to derive a text-based transcript; providing the derived text-based transcript as input to a pretrained machine learning model, wherein the pretrained machine learning model processes the input transcript and outputs one or more keywords and key phrases; and adding the outputted keywords and key phrases to the text extracted from the content items.

In Example 5, the subject matter of Examples 1-4 includes, wherein constructing the interest graph comprises: providing the plurality of keywords and key phrases as input to an embedding model; wherein the embedding model outputs a vector representation for each keyword and key phrase in a common embedding space, such that keywords and key phrases that are similar to one another have vector representations that are close in distance to one another.

In Example 6, the subject matter of Example 5 includes, wherein the embedding model determines similarity between keywords and key phrases based on at least one of: co-occurrence of the keywords and key phrases together within individual content items; co-engagement data indicating that a user has viewed two content items, wherein each content item includes one of the keywords or key phrases; or contextual usage of the keywords and key phrases together within a textual context.

In Example 7, the subject matter of Examples 5-6 includes, generating edges between nodes in the interest graph based on co-occurrence of keywords and key phrases within content items, wherein a higher frequency of co-occurrence results in a higher edge weight between nodes.

In Example 8, the subject matter of Examples 1-7 includes, wherein obtaining the plurality of content items comprises retrieving previously submitted content items from a database, wherein the previously submitted content items had been previously posted to the online platform by users of the online platform.

In Example 9, the subject matter of Examples 1-8 includes, preparing a training dataset for a pairwise machine learning model by: pairing each image and video content item with one or more relevant keywords or key phrases from the interest graph, wherein the keywords and key phrases are derived from text associated with each content item; and training the pairwise machine learning model on the prepared training dataset, wherein the model learns a joint embedding space that brings closer together embeddings of image and text content that correspond to each other; wherein training the model involves minimizing a contrastive loss function that brings closer together embeddings of corresponding image and text pairs from the training dataset, while pushing apart embeddings of non-corresponding image and text pairs.

Example 10 is a system comprising: one or more processors; a memory storage device storing instructions thereon, which, when executed by the one or more processors, cause the system to perform operations comprising: obtaining a plurality of content items from each content delivery source of a plurality of content delivery sources of an online platform, each content delivery source having content items in a different content format; applying distinct preprocessing steps to the content items from each content delivery source to extract text from the plurality of content items; identifying from the text extracted from the content items a plurality of keywords and key phrases; and constructing an interest graph from the plurality of keywords and key phrases, the interest graph having as nodes a vector representation of a keyword or key phrase, and having edges connecting nodes, wherein the edges represent a measure of similarity between connected nodes.

In Example 11, the subject matter of Example 10 includes, wherein the distinct preprocessing steps applied to content items from a first content delivery source comprise: identifying one or more hashtags in the content items from the first content delivery source; separating each hashtag into individual words; and adding the separated words to the text extracted from the content items from the first content delivery source.

In Example 12, the subject matter of Examples 10-11 includes, wherein the distinct preprocessing steps applied to content items from a second content delivery source comprise: identifying a heading or title associated with a content item from the second content delivery source; extracting text from the identified heading or title; and adding the extracted text to the text extracted from the content items from the second content delivery source.

In Example 13, the subject matter of Examples 10-12 includes, for each content item from the plurality of content delivery sources that includes a video clip, processing the video clip using speech-to-text transcription to derive a text-based transcript; providing the derived text-based transcript as input to a pretrained machine learning model, wherein the pretrained machine learning model processes the input transcript and outputs one or more keywords and key phrases; and adding the outputted keywords and key phrases to the text extracted from the content items.

In Example 14, the subject matter of Examples 10-13 includes, wherein constructing the interest graph comprises: providing the plurality of keywords and key phrases as input to an embedding model; wherein the embedding model outputs a vector representation for each keyword and key phrase in a common embedding space, such that keywords and key phrases that are similar to one another have vector representations that are close in distance to one another.

In Example 15, the subject matter of Example 14 includes, wherein the embedding model determines similarity between keywords and key phrases based on at least one of: co-occurrence of the keywords and key phrases together within individual content items; co-engagement data indicating that a user has viewed two content items, wherein each content item includes one of the keywords or key phrases; or contextual usage of the keywords and key phrases together within a textual context.

In Example 16, the subject matter of Examples 14-15 includes, generating edges between nodes in the interest graph based on co-occurrence of keywords and key phrases within content items, wherein a higher frequency of co-occurrence results in a higher edge weight between nodes.

In Example 17, the subject matter of Examples 10-16 includes, wherein obtaining the plurality of content items comprises retrieving previously submitted content items from a database, wherein the previously submitted content items had been previously posted to the online platform by users of the online platform.

In Example 18, the subject matter of Examples 10-17 includes, preparing a training dataset for a pairwise machine learning model by: pairing each image and video content item with one or more relevant keywords or key phrases from the interest graph, wherein the keywords and key phrases are derived from text associated with each content item; and training the pairwise machine learning model on the prepared training dataset, wherein the model learns a joint embedding space that brings closer together embeddings of image and text content that correspond to each other; wherein training the model involves minimizing a contrastive loss function that brings closer together embeddings of corresponding image and text pairs from the training dataset, while pushing apart embeddings of non-corresponding image and text pairs.

Example 19 is at least one machine-readable medium including instructions that, when executed by processing circuitry, cause the processing circuitry to perform operations to implement of any of Examples 1-18.

Example 20 is an apparatus comprising means to implement of any of Examples 1-18.

Example 21 is a system to implement of any of Examples 1-18.

Example 22 is a method to implement of any of Examples 1-18.

Glossary

"Carrier signal" refers, for example, to any intangible medium that is capable of storing, encoding, or carrying instructions for execution by the machine and includes digital or analog communications signals or other intangible media to facilitate communication of such instructions. Instructions may be transmitted or received over a network using a transmission medium via a network interface device.

"Client device" refers, for example, to any machine that interfaces to a communications network to obtain resources from one or more server systems or other client devices. A client device may be, but is not limited to, a mobile phone, desktop computer, laptop, portable digital assistants (PDAs), smartphones, tablets, ultrabooks, netbooks, laptops, multi-processor systems, microprocessor-based or programmable consumer electronics, game consoles, set-top boxes, or any other communication device that a user may use to access a network.

"Communication network" refers, for example, to one or more portions of a network that may be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, a network or a portion of a network may include a wireless or cellular network, and the coupling may be a Code Division Multiple Access (CDMA) connection, a Global System for Mobile communications (GSM) connection, or other types of cellular or wireless coupling. In this example, the coupling may implement any of a variety of types of data transfer technology, such as Single Carrier Radio Transmission Technology (1xRTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth-generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard-setting organizations, other long-range protocols, or other data transfer technology.

"Component" refers, for example, to a device, physical entity, or logic having boundaries defined by function or subroutine calls, branch points, APIs, or other technologies that provide for the partitioning or modularization of particular processing or control functions. Components may be combined via their interfaces with other components to carry out a machine process. A component may be a packaged functional hardware unit designed for use with other components and a part of a program that usually performs a particular function of related functions. Components may constitute either software components (e.g., code embodied on a machine-readable medium) or hardware components. A "hardware component" is a tangible unit capable of performing certain operations and may be configured or arranged in a certain physical manner. In various examples, one or more computer systems (e.g., a standalone computer system, a client computer system, or a server computer system) or one or more hardware components of a computer system (e.g., a processor or a group of processors) may be configured by software (e.g., an application or application portion) as a hardware component that operates to perform certain operations as described herein. A hardware component may also be implemented mechanically, electronically, or any suitable combination thereof. For example, a hardware component may include dedicated circuitry or logic that is permanently configured to perform certain operations. A hardware component may be a special-purpose processor, such as a field-programmable gate array (FPGA) or an application-specific integrated circuit (ASIC). A hardware component may also include programmable logic or circuitry that is temporarily configured by software to perform certain operations. For example, a hardware component may include software executed by a general-purpose processor or other programmable processors. Once configured by such software, hardware components become specific machines (or specific components of a machine) uniquely tailored to perform the configured functions and are no longer general-purpose processors. It will be appreciated that the decision to implement a hardware component mechanically, in dedicated and permanently configured circuitry, or in temporarily configured circuitry (e.g., configured by software), may be driven by cost and time considerations. Accordingly, the phrase "hardware component" (or "hardware-implemented component") should be understood to encompass a tangible entity, be that an entity that is physically constructed, permanently configured (e.g., hardwired), or temporarily configured (e.g., programmed) to operate in a certain manner or to perform certain operations described herein. Considering examples in which hardware components are temporarily configured (e.g., programmed), each of the hardware components need not be configured or instantiated at any one instance in time. For example, where a hardware component comprises a general-purpose processor configured by software to become a special-purpose processor, the general-purpose processor may be configured as respectively different special-purpose processors (e.g., comprising different hardware components) at different times. Software accordingly configures a particular processor or processors, for example, to constitute a particular hardware component at one instance of time and to constitute a different hardware component at a different instance of time. Hardware components can provide information to, and receive information from, other hardware components. Accordingly, the described hardware components may be regarded as being communicatively coupled. Where multiple hardware components exist contemporaneously, communications may be achieved through signal transmission (e.g., over appropriate circuits and buses) between or among two or more of the hardware components. In examples in which multiple hardware components are configured or instantiated at different times, communications between such hardware components may be achieved, for example, through the storage and retrieval of information in memory structures to which the multiple hardware components have access. For example, one hardware component may perform an operation and store the output of that operation in a memory device to which it is communicatively coupled. A further hardware component may then, at a later time, access the memory device to retrieve and process the stored output. Hardware components may also initiate communications with input or output devices, and can operate on a resource (e.g., a collection of information). The various operations of example methods described herein may be performed, at least partially, by one or more processors that are temporarily configured (e.g., by software) or permanently configured to perform the relevant operations. Whether temporarily or permanently configured, such processors may constitute processor-implemented components that operate to perform one or more operations or functions described herein. As used herein, "processor-implemented component" refers to a hardware component implemented using one or more processors. Similarly, the methods described herein may be at least partially processor-implemented, with a particular processor or processors being an example of hardware. For example, at least some of the operations of a method may be performed by one or more processors or processor-implemented components, also referred to as "computer-implemented." Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an API). The performance of certain of the operations may be distributed among the processors, not only residing within a single machine, but deployed across a number of machines. In some examples, the processors or processor-implemented components may be located in a single geographic location (e.g., within a home environment, an office environment, or a server farm). In other examples, the processors or processor-implemented components may be distributed across a number of geographic locations.

"Computer-readable storage medium" refers, for example, to both machine-storage media and transmission media. Thus, the terms include both storage devices/media and carrier waves/modulated data signals. The terms "machine-readable medium," "computer-readable medium" and "device-readable medium" mean the same thing and may be used interchangeably in this disclosure.

"Ephemeral message" refers, for example, to a message that is accessible for a time-limited duration. An ephemeral message may be a text, an image, a video and the like. The access time for the ephemeral message may be set by the message sender. Alternatively, the access time may be a default setting or a setting specified by the recipient. Regardless of the setting technique, the message is transitory.

"Machine storage medium" refers, for example, to a single or multiple storage devices and media (e.g., a centralized or distributed database, and associated caches and servers) that store executable instructions, routines and data. The term shall accordingly be taken to include, but not be limited to, solid-state memories, and optical and magnetic media, including memory internal or external to processors. Specific examples of machine-storage media, computer-storage media and device-storage media include non-volatile memory, including by way of example semiconductor memory devices, e.g., erasable programmable read-only memory (EPROM), electrically erasable programmable read-only memory (EEPROM), FPGA, and flash memory devices; magnetic disks such as internal hard disks and removable disks; magneto-optical disks; and CD-ROM and DVD-ROM disks The terms "machine-storage medium," "device-storage medium," "computer-storage medium" mean the same thing and may be used interchangeably in this disclosure. The terms "machine-storage media," "computer-storage media," and "device-storage media" specifically exclude carrier waves, modulated data signals, and other such media, at least some of which are covered under the term "signal medium."

"Non-transitory computer-readable storage medium" refers, for example, to a tangible medium that is capable of storing, encoding, or carrying the instructions for execution by a machine.

"Signal medium" refers, for example, to any intangible medium that is capable of storing, encoding, or carrying the instructions for execution by a machine and includes digital or analog communications signals or other intangible media to facilitate communication of software or data. The term "signal medium" shall be taken to include any form of a modulated data signal, carrier wave, and so forth. The term "modulated data signal" means a signal that has one or more of its characteristics set or changed in such a matter as to encode information in the signal. The terms "transmission medium" and "signal medium" mean the same thing and may be used interchangeably in this disclosure.

"User device" refers, for example, to a device accessed, controlled or owned by a user and with which the user interacts perform an action or interaction on the user device, including an interaction with other users or computer systems.

What is claimed is:

1. A computer-implemented method comprising:
   obtaining a plurality of content items from a plurality of content delivery sources of an online platform, each content delivery source having respective content items in a different type of content format;
   applying distinct preprocessing steps to the respective content items from each content delivery source to extract text from the plurality of content items, wherein the distinct preprocessing steps are specific to the different content format of each content delivery source and include separate preprocessing pipelines for processing different types of content formats, wherein the preprocessing steps comprise source-specific preprocessing tailored to each type of content format and generalized source-agnostic preprocessing;
   identifying, from the text extracted from the plurality of content items, a plurality of keywords and key phrases;
   constructing an interest graph from the plurality of keywords and key phrases, the interest graph having as nodes, wherein each node is a vector representation of a keyword or key phrase, and having edges connecting the nodes, wherein each of the edges represents a measure of similarity between two connected nodes, wherein the constructing of the interest graph comprises providing the plurality of keywords and key phrases as input to an embedding model that outputs vector representations in a common embedding space based on co-engagement patterns determined from user behavior, wherein the co-engagement patterns are identified by detecting when a user interacts with two of the plurality of content items including one of the keywords or key phrases, such that keywords and key phrases that are similar to one another based on the co-engagement patterns have vector representations that are closer in distance to one another;
   preparing a training dataset for a pairwise machine learning model by pairing each image and video content item with one or more relevant keywords or key phrases from the constructed interest graph; and
   training a pairwise machine learning model on the prepared training dataset, wherein the training involves minimizing a contrastive loss function that brings closer together embeddings of corresponding image and text pairs from the training dataset, while pushing apart embeddings of non-corresponding image and text pairs.

2. The computer-implemented method of claim 1, wherein the distinct preprocessing steps applied to content items from a first content delivery source comprise:
   identifying one or more hashtags in the content items from the first content delivery source;
   separating each hashtag into individual words; and
   adding the separated words from the first content delivery source to the text extracted from the plurality of content items.

3. The computer-implemented method of claim 1, wherein the distinct preprocessing steps applied to content items from a second content delivery source comprise:
- identifying a heading or title associated with a content item from the second content delivery source;
- extracting text from the identified heading or title; and
- adding the extracted text from the second content delivery source to the text extracted from the plurality of content items.

4. The computer-implemented method of claim 1, further comprising:
- for each content item from the plurality of content delivery sources that includes a video clip, processing the video clip using speech-to-text transcription to derive a text-based transcript;
- providing the derived text-based transcript as input to a pretrained machine learning model, wherein the pretrained machine learning model processes the input transcript and outputs one or more keywords and key phrases; and
- adding the one or more outputted keywords and key phrases to the text extracted from the plurality of content items.

5. The computer-implemented method of claim 1, wherein the embedding model further determines similarity between the keywords and key phrases based on at least one of:
- co-occurrence of the keywords and key phrases together within individual content items; or
- contextual usage of the keywords and key phrases together within a textual context.

6. The computer-implemented method of claim 1, further comprising:
- generating the edges between the nodes in the interest graph based on co-occurrence of keywords and key phrases within the plurality of content items, wherein a higher frequency of co-occurrence results in a higher edge weight between respective nodes.

7. The computer-implemented method of claim 1, wherein the obtaining of the plurality of content items comprises retrieving previously submitted content items from a database, wherein the previously submitted content items had been previously posted to the online platform by users of the online platform.

8. The computer-implemented method of claim 1, wherein:
- the pairwise machine learning model learns a joint embedding space that brings closer together embeddings of image and text content that correspond to each other.

9. A system comprising:
- one or more hardware processors;
- a memory storage device storing instructions thereon, which, when executed by the one or more hardware processors, cause the system to perform operations comprising:
  - obtaining a plurality of content items from a plurality of content delivery sources of an online platform, each content delivery source having respective content items in a different type of content format;
  - applying distinct preprocessing steps to the respective content items from each content delivery source to extract text from the plurality of content items, wherein the distinct preprocessing steps are specific to the different content format of each content delivery source and include separate preprocessing pipelines for processing different types of content formats, wherein the preprocessing steps comprise source-specific preprocessing tailored to each type of content format and generalized source-agnostic preprocessing;
  - identifying, from the text extracted from the plurality of content items, a plurality of keywords and key phrases;
  - constructing an interest graph from the plurality of keywords and key phrases, the interest graph having as nodes, wherein each node is a vector representation of a keyword or key phrase, and having edges connecting the nodes, wherein each of the edges represents a measure of similarity between two connected nodes, wherein the constructing of the interest graph comprises providing the plurality of keywords and key phrases as input to an embedding model that outputs vector representations in a common embedding space based on co-engagement patterns determined from user behavior, wherein the co-engagement patterns are identified by detecting when a user interacts with two of the plurality of content items including one of the keywords or key phrases, such that keywords and key phrases that are similar to one another based on the co-engagement patterns have vector representations that are closer in distance to one another;
  - preparing a training dataset for a pairwise machine learning model by pairing each image and video content item with one or more relevant keywords or key phrases from the constructed interest graph; and
  - training a pairwise machine learning model on the prepared training dataset, wherein the training involves minimizing a contrastive loss function that brings closer together embeddings of corresponding image and text pairs from the training dataset, while pushing apart embeddings of non-corresponding image and text pairs.

10. The system of claim 9, wherein the distinct preprocessing steps applied to content items from a first content delivery source comprise:
- identifying one or more hashtags in the content items from the first content delivery source;
- separating each hashtag into individual words; and
- adding the separated words from the first content delivery source to the text extracted from the plurality of content items.

11. The system of claim 9, wherein the distinct preprocessing steps applied to content items from a second content delivery source comprise:
- identifying a heading or title associated with a content item from the second content delivery source;
- extracting text from the identified heading or title; and
- adding the extracted text from the second content delivery source to the text extracted from the plurality of content items.

12. The system of claim 9, further comprising:
- for each content item from the plurality of content delivery sources that includes a video clip, processing the video clip using speech-to-text transcription to derive a text-based transcript;
- providing the derived text-based transcript as input to a pretrained machine learning model, wherein the pretrained machine learning model processes the input transcript and outputs one or more keywords and key phrases; and adding the one or more outputted keywords and key phrases to the text extracted from the plurality of content items.

13. The system of claim 9, wherein the embedding model further determines similarity between the keywords and key phrases based on at least one of:
co-occurrence of the keywords and key phrases together within individual content items; or
contextual usage of the keywords and key phrases together within a textual context.

14. The system of claim 9, further comprising:
generating the edges between the nodes in the interest graph based on co-occurrence of keywords and key phrases within the plurality of content items, wherein a higher frequency of co-occurrence results in a higher edge weight between respective nodes.

15. The system of claim 9, wherein the obtaining of the plurality of content items comprises retrieving previously submitted content items from a database, wherein the previously submitted content items had been previously posted to the online platform by users of the online platform.

16. The system of claim 9, wherein:
the pairwise machine learning model learns a joint embedding space that brings closer together embeddings of image and text content that correspond to each other.

17. A system comprising:
means for obtaining a plurality of content items from a plurality of content delivery sources of an online platform, each content delivery source having respective content items in a different type of content format;
means for applying distinct preprocessing steps to the respective content items from each content delivery source to extract text from the plurality of content items, wherein the distinct preprocessing steps are specific to the different content format of each content delivery source and include separate preprocessing pipelines for processing different types of content formats, wherein the preprocessing steps comprise source-specific preprocessing tailored to each type of content format and generalized source-agnostic preprocessing;
means for identifying, from the text extracted from the plurality of content items, a plurality of keywords and key phrases;
means for constructing an interest graph from the plurality of keywords and key phrases, the interest graph having as nodes, wherein each node is a vector representation of a keyword or key phrase, and having edges connecting the nodes, wherein each of the edges represents a measure of similarity between two connected nodes, wherein the constructing of the interest graph comprises providing the plurality of keywords and key phrases as input to an embedding model that outputs vector representations in a common embedding space based on co-engagement patterns determined from user behavior, wherein the co-engagement patterns are identified by detecting when a user interacts with two of the plurality of content items including one of the keywords or key phrases, such that keywords and key phrases that are similar to one another based on the co-engagement patterns have vector representations that are closer in distance to one another;
means for preparing a training dataset for a pairwise machine learning model by pairing each image and video content item with one or more relevant keywords or key phrases from the constructed interest graph; and
means for training a pairwise machine learning model on the prepared training dataset, wherein the training involves minimizing a contrastive loss function that brings closer together embeddings of corresponding image and text pairs from the training dataset, while pushing apart embeddings of non-corresponding image and text pairs.

18. The system of claim 17, wherein:
the pairwise machine learning model learns a joint embedding space that brings closer together embeddings of image and text content that correspond to each other.

* * * * *